United States Patent [19]
Iwamasa

[11] Patent Number: 5,793,933
[45] Date of Patent: Aug. 11, 1998

[54] COMPUTER-IMPLEMENTED SYSTEM AND METHOD FOR CONSTRUCTING A SYSTEM

[75] Inventor: Mikito Iwamasa, Kawaguchi, Japan

[73] Assignee: Kabushiki Kaisha Toshiba, Kawasaki, Japan

[21] Appl. No.: 895,997

[22] Filed: Jul. 17, 1997

Related U.S. Application Data

[63] Continuation of Ser. No. 305,452, Sep. 13, 1994, abandoned.

[30] Foreign Application Priority Data

Sep. 13, 1993 [JP] Japan ................................. 5-227548

[51] Int. Cl.$^6$ ................................................. G06F 15/18
[52] U.S. Cl. ................................................. 395/50
[58] Field of Search ........................... 395/50, 60

[56] References Cited

U.S. PATENT DOCUMENTS

| | | | |
|---|---|---|---|
| 4,965,743 | 10/1990 | Malin et al. | 395/50 |
| 5,058,033 | 10/1991 | Bonissone et al. | 395/50 |
| 5,150,367 | 9/1992 | Tong et al. | 395/183.02 |
| 5,214,577 | 5/1993 | Sztipanovits et al. | 364/184 |
| 5,272,704 | 12/1993 | Tong et al. | 395/183.02 |
| 5,412,756 | 5/1995 | Bauman et al. | 395/50 |
| 5,420,977 | 5/1995 | Sztipanovits et al. | 395/160 |
| 5,428,619 | 6/1995 | Schwartz et al. | 371/20.1 |
| 5,467,355 | 11/1995 | Umeda et al. | 364/571.04 |

OTHER PUBLICATIONS

"Model–Based Diagnostic Reasoning Using VHDL"; R.A. Marcotte, et al.; Performance and Fault Modeling with VHDL; J.M. Schoen (eds.), pp. 304–399, 1992.

"A Theory of Diagnosis from the First Principle"; R. Reiter; Artificial Intelligence 32, 1987.

Adamovits et al., Simulation (Model) based fault detection and diagnosis of a spacecraft electrical power system. Proceedings of the 9th conference on artificial intellegence for applications. pp. 422–428, Mar. 5, 1993.

Lee et al., Repair: A model–based diagnosis system, UK IT 1990 conference, pp. 266–270, Mar. 22, 1990.

Chu, Fault diagnosis with continious system models. IEEE transactions on systems, Man and Cybernetics, pp. 55–64, Feb. 1993.

Hofmann, Model–base ddiagnosis directed by heuristic search. Proceedings: The 9th conference on Artificial intellegence for applications, pp. 197–203, Mar. 5, 1993.

Marcotte et al., System–level applications of model based diagnostic reasoning. Combined proceedings of the 1990 and 1991 Leesburg workshop on reliability and Maintainability, pp. 123–130, Oct. 3, 1991.

*Primary Examiner*—Robert W. Downs
*Assistant Examiner*—Sanjiu Shah
*Attorney, Agent, or Firm*—Oblon, Spivak, McClelland, Maier & Neustadt, P.C.

[57] ABSTRACT

A computer-implemented system for helping to construct a model-based diagnostic system which allows a user to customize the model-based diagnostic system according to the nature of various diagnosis targets. Unit procedure data including the operation of the deducing unit 4, hypothesizing unit 5, and verification unit 6 is stored in the unit procedure data storage unit 13. When the user uses the customization unit 14 to select unit procedure data in a desired sequence, the customize unit 14 stores user-selected unit procedure data or data to identify the unit procedure data in the deductive procedure data storage unit 8, hypothesize procedure data storage unit 9, and verification procedure data storage unit 10, respectively. The deductive unit 4, hypothesize unit 5, and verification unit 6 each refer to procedure data during operation to know processing function names that are set.

9 Claims, 27 Drawing Sheets

FIG. 6

```
name:      part 3
export:    parameter X,parameter Y,parameter A
local:     parameter=value 1 or constraint relational expression 1,...
Connect;   parameter X:connection 1,
           parameter Y:connection 3,
           parameter A:connection 2,
effect:    parameter X,parameter Y
cause:     parameter A
forward:   mode 1:IF constraint relational expression 1a
                  THEN constraint relational expression 1b
                  ....
           mode 2:....
backward:  mode 1:IF constraint relational expression 1b
                  THEN constraint relational expression 1a
                 :IF constraint relational expression 1d
                  THEN constraint relational expression 1c
                  ....
           mode 2:....
```

FIG. 7

```
name:    connection 1
term1:   part 1,parameter 1
term2:   part 3,parameter X
weight:  1.0
```

FIG. 8

```
name:         part 3
a_part_of:    none
has_a:        partial element 3a, partial element 3b
correspond:   parameter X:partial element 3a:parameter X1
              parameter Y:partial element 3a:parameter Y1
              parameter A:partial element 3b:parameter A3
```

FIG. 10

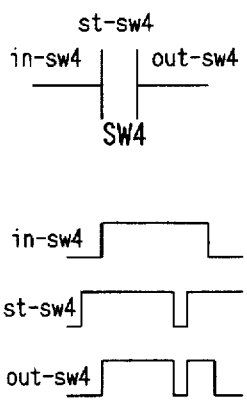

```
name:      sw4
export:    in-sw4,st-sw4,out-sw4
local:     none
connect:   in-sw4:connection 1
           st-sw4:none
           out-sw4:connection 2
effect:    out-sw4
cause:     in-sw4,st-sw4
st-sw4:    normal: IF &&(equal(in-sw4,1,[t,t2]),
                         given(st-sw4,[t1,t2]))
                   THEN bind(out-sw4,st-sw4,[t1,t2])
                   IF equal(st-sw4,0,[t1,t2])
                   THEN bind(out-sw4,0,[t1,t2])
backward:  normal: IF equal(out-sw4,1,[t1,t2])
                   THEN &&(bind(in-sw4,1,[t1,t2]),
                           bind(st-sw4,1,[t1,t2]))
```

FIG. 11

```
name:        sw4
a_part_of:   none
has_a:       none
correspond:  none
```

FIG. 12

```
name:   connection 1 term1:  or,out-or term2:  sw4,in-sw4
```

FIG. 13

| | |
|---|---|
| name: | connection 2 |
| term1: | c2,in-c2 |
| term2: | sw4,out-sw4 |

FIG. 14 deductive-means : ded-func1
                  ded-func2
                  ded-func3 hypothesize-means : hyp-func1
                    hyp-func2 verification-means : ver-func1
                     ver-func2
                     ver-func3
                     ver-func4

FIG. 15 target : ded-func1
option : none

FIG. 16 input call(deductive-means)

if(status(deductive-means)==normal)
then goto NEXT1
else goto ERROR

NEXT1: call(hypothesize-means)

if(status(deductive-means)==normal)
then goto NEXT2
else goto ERROR

NEXT2: call(verification-means)

if(status(verification-means)==normal)
then goto NEXT3
else goto ERROR

NEXT3: output(diagnosis)

return

ERROR: output(error)

return

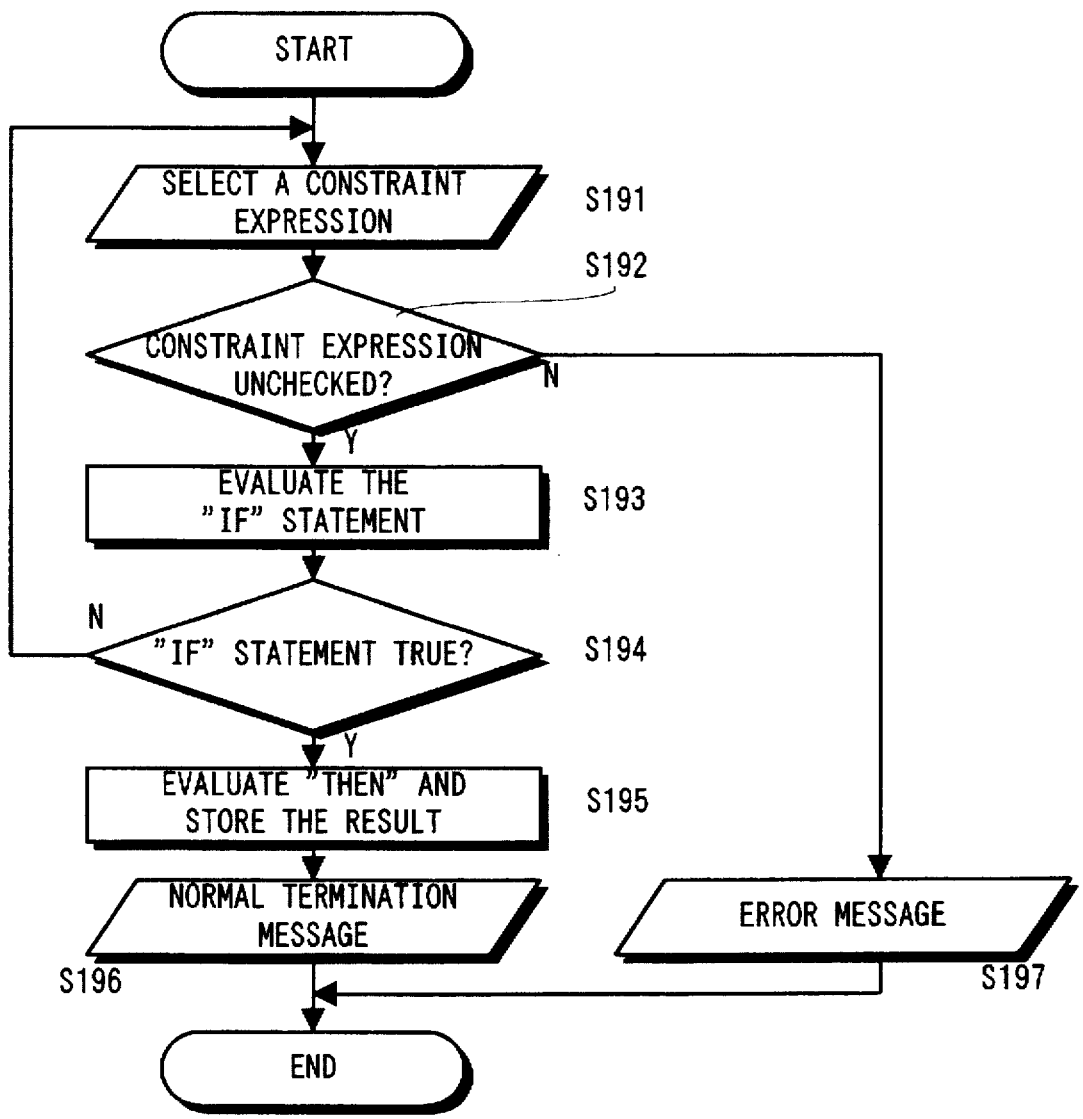

F I G. 2 0
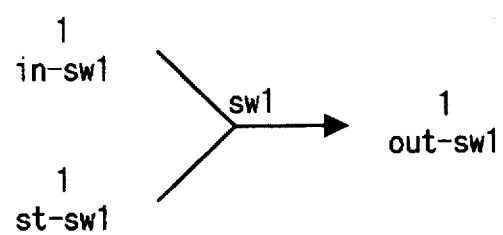

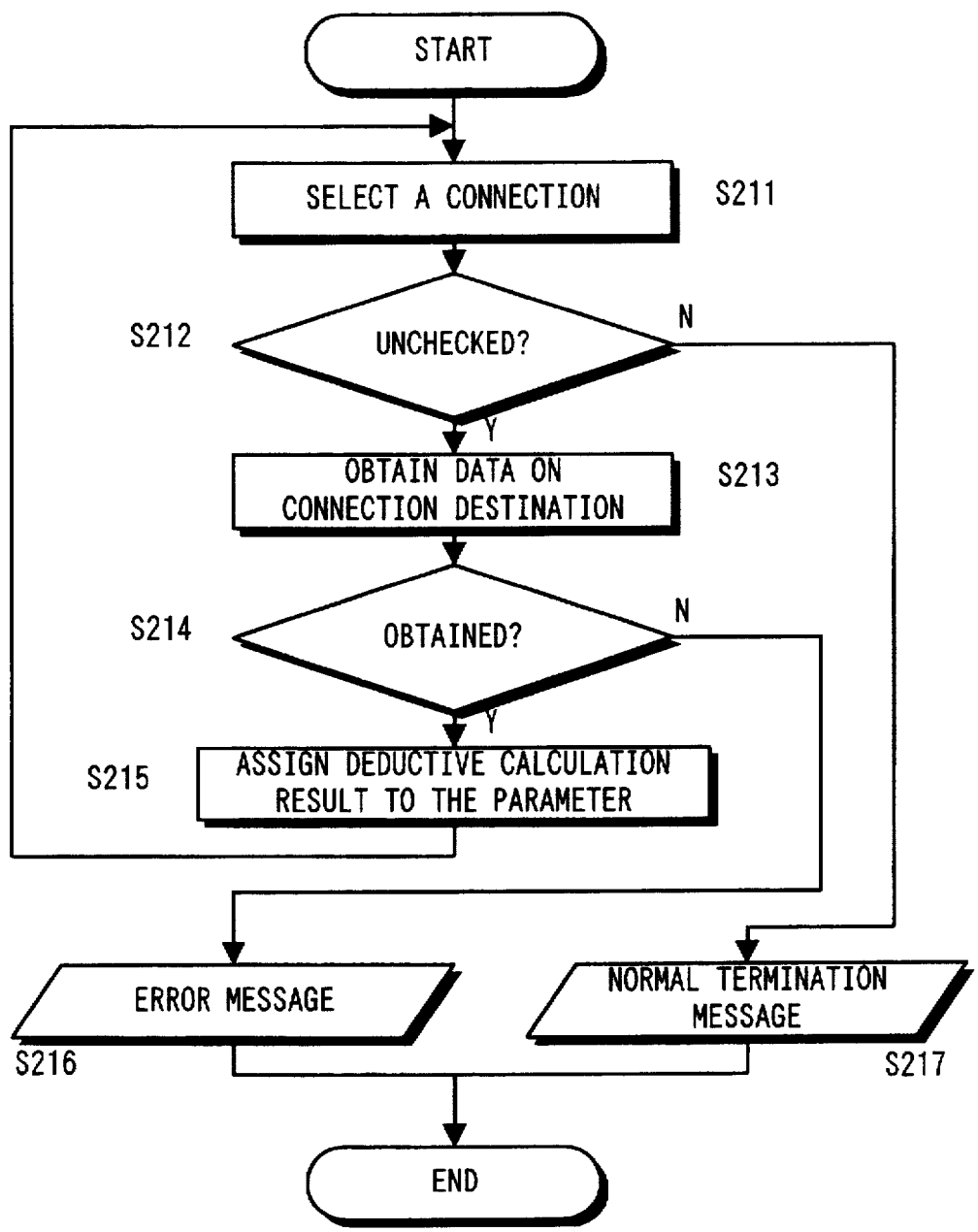

FIG. 22

$$\underset{\text{out-sw1}}{1} \quad \dashrightarrow^{t} \quad \underset{\text{in-c1}}{1}$$

COMPUTER-IMPLEMENTED SYSTEM AND METHOD FOR CONSTRUCTING A SYSTEM

This application is a Continuation of application Ser. No. 08/305,452, filed on Sep. 13, 1994, now abandoned.

BACKGROUND OF THE INVENTION

This invention relates to a model-based diagnostic system construction support system for constructing a model-based diagnostic system.

An expert system (ES), where knowledge necessary for problem solving is stored in a knowledge base, uses computers to do highly complex and intelligent data processing and decision making which have been done human beings. Conventionally, those knowledge bases used for expert systems are built using emperical knowledge acquired through interview with experts. This emperical knowledge represents only the cause-and-effect relationship between "abnormal symptom" observed in the target to diagnose and the description of the disorder which causes the symptom (called "abnormality hypothesis"). This type of knowledge, expressed in IF-THEN rules, is generally called "shallow knowledge". This type of knowledge is represented in a knowledge base, for example, in a series of such expressions as "If A is a and B is b, then C is c". The following problems are pointed out for this emperical knowledge. (Reference 1: Report on Model Reasoning" by Riichiro Mizoguchi, 1991).

The problems are: (1) It is impossible to built an ES where emperical knowledge is not accumulated. (2) Even in an area where empirical knowledge is accumulated, it is difficult to collect all the knowledge the experts have and to build a complete knowledge base. (3) A traditional reasoning system provides the user only with a chain of empirical knowledge used for problem solving, but not with a valid reason why a specific empirical knowledge is used in a specific situation.

To solve this problem, a reasoning system using general principles that apply to reasoning targets or problem areas is proposed. This type of reasoning system stores all the attributes of diagnosis targets, including their functions, structures, causes and effects, and behaviors, for use in reasoning. A diagnostic system using this reasoning system, called a model-based diagnostic system, uses the general principles to reason about and describe the cause and effect relationship between abnormal disorders and observed symptoms. In contrast to the above-mentioned "shallow knowledge", this type of model is called a "deep knowledge" or a "model", and a reasoning method using this deep knowledge or model is called "model-based diagnosis". Model-based reasoning is defined simply in Reference 2 (R. M. Keller, et. al. "Applying Knowledge Compilation Techniques to Mode-Based Reasoning", IEEE Expert, Vol. 6, No. 2 PP82-87, 1991.).

"A model-based reasoning system uses an easy-to-understand model to execute reasoning based on the basic principle concerning the construction, behavior, and cause-and-effect of a reasoning target. On the other hand, a traditional shallow reasoning system only performs associative reasoning based on pure pattern thinking without considering the cause-and-effect or behavior mechanism that potentially exist in a reasoning target".

As we can understand from the above discussion, model-based reasoning is one of the most important techniques to build a sophisticated ES in the next generation. However, the definition of model-based reasoning is rather abstract; a specific model representation format or reasoning algorithm design is generated for the problem area of each target.

"Model-based diagnosis" is a form of model-based reasoning specifically applied to diagnosis problems. In the artificial intelligence (AI) research and development field, model-based diagnosis refers to a series of techniques formulated by Reiter as described below. (Reference 3: R. Reiter, "A Theory of Diagnosis from the First Principle", Artificial Intelligence 32, pp. 57–95, 1987. /Reference 4: R. A. Marcotte, et. al. "Model-Based Diagnostic Reasoning Using VHDL", Performance and Fault Modeling with VHDL, J. M. Schoen (eds.), pp. 304–399, 1992).

In Reference 3, model-based diagnosis is formulated as follows: "Model-based diagnosis is to identify an abnormal target component based on 'observed values', 'target's structure' and 'model behavior'". In other words, "target's structure" corresponds to the knowledge generated by defining "what components constitute the target to diagnose and how those components are connected with each other". And, "model behavior" corresponds to the knowledge generated by defining the functional input/output specifications of each component.

In this case, the purpose of the basic principle of model-based diagnosis is to find a conflict between the "observed values" of input/output data and "behavioral model". To do this reasoning, the following three functions are necessary:

1. Behavior calculation

This function uses "observed values" and "behavior model" to calculate the values of observed data not yet calculated.

2. Conflict checking

This function compares the calculation result with the "observed values".

3. Propagation

This function propagates the calculation result according to the target's structure, and performs behavior calculation and conflict checking again.

Reference 4 describes how to implement the concept of this model-based diagnosis that is applied to the diagnosis of a digital calculation circuit. The concept used in this implementation is basically the same as that used in the above-mentioned model-based diagnosis. However, this implementation not also finds a conflict between the observed value and the behavioral model; it also finds non-conflicting areas to select most-likely hypothesis information about the cause (mentioned as "abnormality hypothesis" in this specification) by pruning unnecessary candidates.

Many research papers on this model-based diagnosis are published, but not many patents are applied. An example of patent is Japanese Non-Examined Patent Publication No. 2-146629 "Fault Diagnosis System and Reasoning System" (hereafter called "Patent Application 1"). This patent, with an aim to solve the problem of a shallow ES inherent in production tools, uses a model to increase reasoning power and to reduce the knowledge base maintenance load. As an embodiment, it uses a diagnostic system using electric equipment structure model.

As discussed above, the model-based diagnosis technique for individual systems has been studied, but there are few studies on the construction support environment of a model-based diagnosis ES. This is because model-based diagnostic mechanism and model representation format are not yet fully formulated and so the construction support environment must be established for each application. This means that conventional model-based diagnostic ES construction support environment are too specific to a particular problem area and its application range is limited.

Japanese Non-Examined Patent Publication No. 2-35527 "Knowledge Base System Construction Method" (hereafter called "Patent Application 2"), deals with this problem. This patent divides the tasks associated with the problem (reasoning units) into the following three hierarchies for formulation and, by combining these hierarchies, constructs an ES.

High level: Strategy decision tasks for problem solving

Intermediate level: Partial problem tasks for constituting the target problem

Low level: Input/output tasks for accessing databases This patent uses a power system diagnostic problem as an embodiment. In that diagnostic system, the high level consists of problem solving strategy decision tasks "hypothesis generation", "simulation", and "verification", the intermediate level consists of partial problem tasks "hypothesis status setup via forward interpreter", "observed value extraction and protection range recognition via backward interpreter", and "hypothesis modification data extraction via comparison between observed value and simulation results", and the low level consists of data access tasks such as "fault point", "malfunction", and "CB trip".

Although model-based diagnosis formulation introduced in Reference 3 is very general, specific methods including how to describe a model, how to calculate behaviors, how to check conflicts, how to do propagation are not pointed out. This is because formulation in Reference 3 is described only in terms of theorem proving that for a model described in logical expressions. Thus, the description in Reference 3 is so abstract that it is impossible to design a specific diagnostic system that is based only on that description.

On the other hand, the model-based diagnostic system (GMODS) introduced in Reference 4, which is described more in detail, gives us information useful in designing a specific diagnostic system. However, Reference 4 describes diagnosis specialized only for digital calculation circuits such as event-based model description or event-based simulation mechanism. Therefore, except for digital logic circuit diagnosis, it is practically impossible to design a diagnostic system based on the description in Reference 4.

The fault diagnosis system introduced in Patent Application 1 cannot be used in sophisticated diagnostic processing because of its model contents and logic method construction, and so system performance will not be increased significantly. For example, although the function and structure of the diagnosis target in the model of Patent 1 is represented hierarchically, the hierarchy defines only the subordination of the components. No specific method is given as to how each component is represented and how to do reasoning based on the function of each component.

The mechanism of the reasoning media in Patent Application 1 is too simple. That is, when it receives the state of a component, it simply propagates it to the lowest component, and the state of a component allowed in that system is either "normal" or "abnormal". In addition, although Patent Application 1 states that the incremental state difference between before-propagation and after-propagation can be used in diagnosis, this proposition applies only to a particular problem area, not to general problem areas.

The knowledge base construction method introduced in Patent Application 2 is characterized by formulation via task hierarchy. However, in this patent application, how to define and handle tasks, which is very important, is not described at all (that is, task analysis method, task contents change and modification method, and detailed contents of a task). Thus, because the method described in Patent Application 2 are too abstract, it is difficult to implement an ES construction support system with the disclosed contents.

SUMMARY OF THE INVENTION

It is an object of this invention to provide a model-based diagnostic system construction support system that allows us to customize a model-based diagnostic system so that it can be used in solving various types of problems.

Furthermore, not only control means but also calculation means, propagation means recording means, prune means selection means can be customized so that it can be used in solving various types of problems by storing and modifying the procedure data representing the procedure of each means.

BRIEF DESCRIPTION OF THE DRAWINGS

FIG. 6 shows the contents of an example of a part function model associated with the model in FIG. 5;

FIG. 7 shows the contents of an example of a structure model associated with the model in FIG. 5;

FIG. 8 is shows the contents of an example of a hierarchical model associated with the model in FIG. 5;

FIG. 10 shows the contents of an element function model of the sequence control device in FIG. 5;

FIG. 11 shows the contents of a hierarchical model of the sequence control device in FIG. 5;

FIG. 12 shows the contents of a structure model of the sequence control device in FIG. 5;

FIG. 13 shows the contents of another part of a structure model of the sequence control device in FIG. 5;

FIG. 14 shows an example of a unit procedure used in an embodiment of this invention;

FIG. 15 shows an example of the contents of deductive procedure data used in an embodiment of this invention;

FIG. 16 shows an example of reasoning control data associated with a model-based diagnostic system which is applied to the sequence control device used in an embodiment of this invention;

FIG. 19 is a flowchart showing deductive calculation defined by deduction calculation procedure data in an embodiment of this invention;

FIG. 20 is a conceptual diagram showing the state in which a value is calculated for the label and for dependency by the deductive calculation means 41 in an embodiment of this invention;

FIG. 21 is a flowchart showing a deductive propagate means defined by deductive propagate procedure data in an embodiment of this invention;

FIG. 22 is a conceptual diagram showing the state in which a value is calculated for the label and for dependency by the deductive propagate means 42 in an embodiment of this invention;

Figure 1:
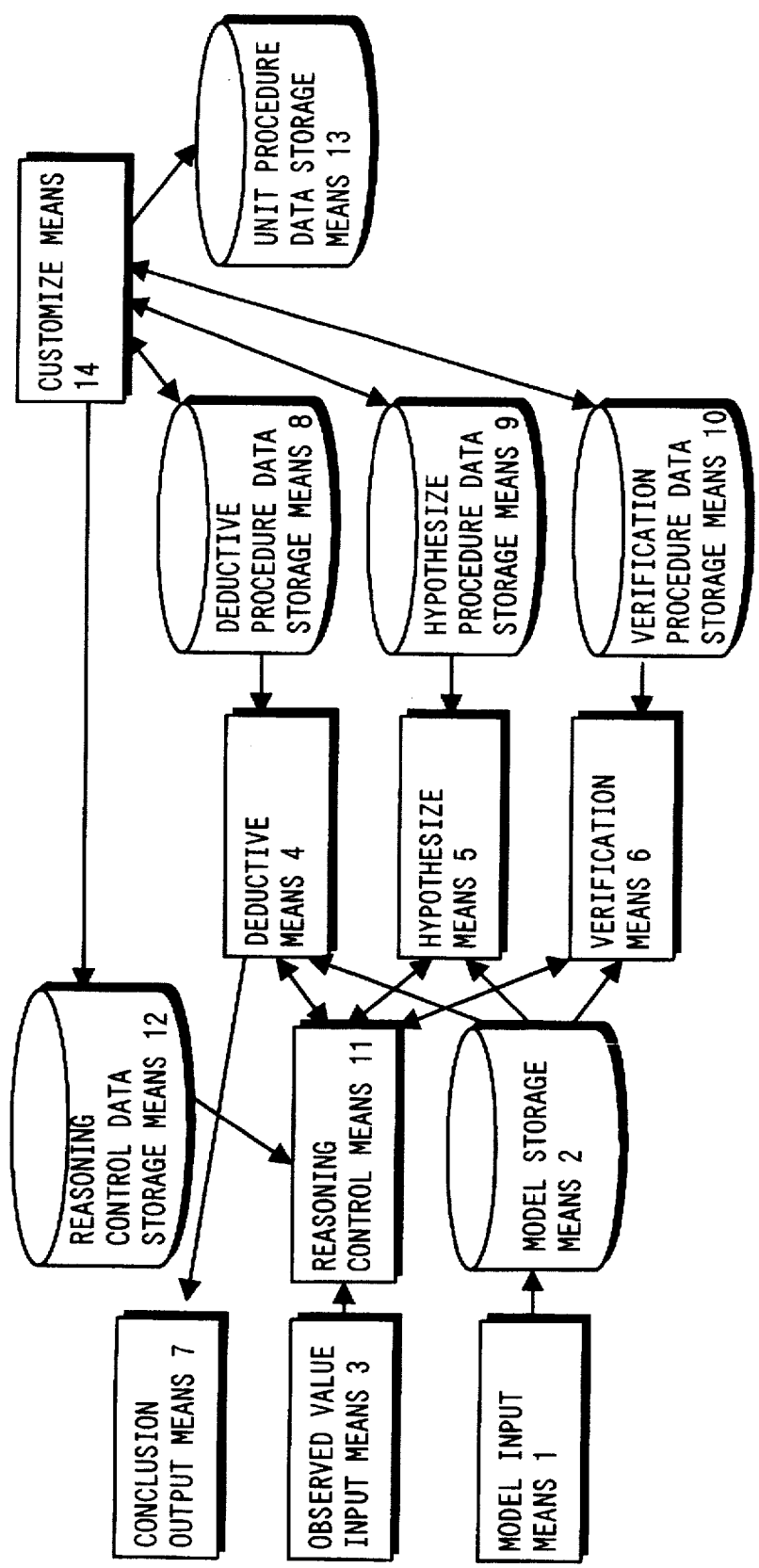
FIG. 1 is a block diagram showing the structure of an embodiment of this invention.

I the drawings,
1 is Model input means,
2 is Model storage means,
3 is Observed value input means,
4 is Deductive means,
5 is Hypothesize means,
6 is Verification means,
7 is Conclusion output means,
8 is Deductive procedure data storage means,
9 is Hypothesize procedure data storage means,
10 is Verification procedure data storage means,
11 is Reasoning control means,
12 is Reasoning control data storage means,
13 is Unit procedure data storage means,
14 is Customize means,
15 is Verification calculation procedure data storage means,
16, 82 is Verification (deductive) propagate procedure data a storage means,
17 is Verification prune procedure data storage means,
18 is Verification control data storage means,
21 Element functional model storage means,
22 is Structure model storage means,
23 is Hierarchical model storage means,
41 is Deductive calculation means,
42, 62 is Deductive (verification) propagate means
43 is Deductive control means,
61 is Verification calculation means,
63 is Verification prune means,
64 is Verification control means,
83 is Deductive control data storage means,
S is Procedure step,
91 is Calculation means,
92 is Propagation means,
93 is Recording means,
94 is Prune means,
95

DETAILED DESCRIPTION

Referring to the drawings, there is shown the preferred embodiments of the present invention. The embodiments shown below are implemented on a computer, and each function of the embodiments is implemented by executing a specified procedure (program) on the computer.

Each "means" described in this specification is a conceptual means corresponding to each function of an embodiment; there is not always one to one correspondence between means and hardware units or software routines. For example, a hardware unit, which act as a means when a statement is executed, may also act as another means when another statement is executed. Similarly, a means, which is implemented by a single statement in some cases, may be implemented by a plurality of statements in some other cases.

Therefore, each embodiment in this specification will be described by way of a virtual circuit block (means) having each function of the embodiment. However, the implementation of the present invention on a computer is an example. All or part of the functions of the present invention may be implemented on an electronic circuit such as a custom chip (custom integrated circuit) if possible.

The computer used in each embodiment is composed of the CPU and main memory (main storage) consisting of RAM (Random Access Memory). The computer may be a computer of any size: microcomputer, personal computer, small computer, workstation, or mainframe.

The hardware of the computer typically includes input devices such as a keyboard and a mouse, external storage such as a hard disk, output devices such as a CRT display device and a printer, as well as necessary input/output control circuits.

The hardware configuration of the computer may be changed as long as the present invention is implemented; that is, some components may be added, replaced, or removed. For example, the embodiment may be implemented on a computer network with a plurality of computers. Any type of computer may be used concurrently, or one CPU may be time-shared for executing a plurality of processes concurrently. Other input devices (for example, pointing devices such as a touch panel, light pen, and track ball, image input devices such as a digitizer or image reader, voice recognition devices, and various types of sensors) may be used. Other external storages (for example, a floppy disk drive, RAM card device, magnetic tape device, optical disk device, optical magnetic disk device, bubble memory, or flash memory) may be used. Other output devices (for example, liquid crystal device, plasma display device, video projector, LED display device, voice generation circuit, or voice synthesizer) may be used.

In order to implement the embodiment on the computer described above, an application program which implements each function of the embodiment is normally executed under the operating system (OS). In addition, a program which implements the embodiment is in the form of machine language produced typically by compiling (translating) the program with the use of a high-level language or an assembler. However, the software configuration of the above described computer may also be changed as long as the present invention may be implemented; for example, an OS is not necessarily used, any form of program may be used, and an interpreter (serial interpretation-execution) such as BASIC may be used.

The program may be stored in any form; that is, it may be stored in ROM (read only memory), or it may be stored in an external storage such as a hard disk for later loading (reading) into memory when the computer is started or processing is started. In addition, the program may be divided into a plurality of modules, each of which is loaded into main memory as necessary. In this case, all the modules of the program need not be in the same form or on the same device.

The execution sequence of the procedure steps of the embodiment may be changed, or the steps may be executed in parallel, as long as the object of the present invention is attained. Each step may be executed in any sequence each time it is executed. The user may change the sequence, for example, by using the menu-driven interface through which he can select one of executable processing options.

The term "input" used in this specification refers not only to the input of data but also to other processing closely associated with data input. This type of processing includes such processing as input data echo-back or data modification and editing. The term "output" used in this specification refers not only to the output of data but also to other processing closely associated with data output. This type of processing includes such processing as the input of output ranges or the instruction of scrolling. In addition, input and output may be integrated through the interactive input/output operation, and selection, specification, and identification may be done thorough this integrated input/output operation.

All the events outside the computer are processed within the computer as data, for example, as event parameters. Data (information) described in this specification may be in any form or on any type of storage. For example, data may be stored on any hardware component (for example, main storage, external storage, CPU registers, or cache memory). In addition, data may be stored in any form. For example, data may be stored in a file, or it may be accessed directly using a physical memory or storage address. Data may be represented in any form; for example, a character string may be represented in characters or words. Data may be stored for the period of time the user wants, and may be erased after the period of time has elapsed. Data that should be stored unaltered for a long time, such as dictionary data, may be stored in ROM.

Any reference to a particular item in this specification assumes that any associated information is also implied. For example, when a disk file is mentioned, it should be understood that the File Allocation Table (FAT) or directories are also mentioned and that their descriptions are omitted. In this specification, general information necessary for the operation of the present invention, such as pointers, counters, flags, parameters, and buffers, is also used as necessary.

Unless otherwise specified, information necessary for the processing of a component in the embodiment is obtained from other components containing the information. This information is obtained, for example, by accessing a variable or memory location containing that information. Note that the erasure or cancellation of information does not necessarily require the deletion of data itself from the storage area; instead, it may be done, for example, by setting the erase flag.

[1. Structure of Embodiment 1]

The following explains a model-based diagnostic system (hereafter called this system), which is an embodiment of this invention, with reference to the accompanying drawings.

[1-1. Outline of the Structure]

This system, a typical embodiment of this invention, is a model-based diagnostic system construction support system (also called "AI shell" or "ES construction tool") which helps the user construct a model-based diagnostic system.

FIG. 1 is a block diagram showing the structure of this system. As shown in this figure, this system has the model input means 1 for accepting (including operations such as modification, deletion) a model representing the attribute (information about function, structure, cause and effect, and behavior) of a diagnosis target, the model storage means 2 for storing the model, and the observed value input means 3 for accepting the observed values of the diagnosis target. The model input means 1 can accept a model which is created by converting design data from the CAD (computer aided design) system or a model processed by a graphic editor or text editor.

This system has the deductive means 4 for deducing the behavior (input/output values) of the diagnosis target based on the model, the hypothesize means 5 for generating abnormality hypothesis candidates which contain information on the cause of the abnormality associated with the observed value based on the deduction result and the observed value (by comparing them), the verification means 6 for verifying the candidates and for selecting conclusions, and the conclusion output means 7 for outputting the conclusions.

This system has the deductive procedure data storage means 8 for storing deductive procedure data representing the operation of the deductive means 4, the hypothesize procedure data storage means 9 for storing hypothesize procedure data representing the operation of the hypothesize means 5, the verification procedure data storage means 10 for storing verification procedure data representing the operation of the verification means 6, the reasoning control means 11 for controlling the coordination of the deductive means 4, the hypothesize means 5, and the verification means 6, and the reasoning control data storage means 12 for storing reasoning control data representing the control via the reasoning control means 11. The word "coordination" in this specification refers to the relationship among means, such as the sequence in which means are started or conditions under which control is transferred.

This system has the unit procedure data storage means 13 for storing unit procedure data (data, processing procedure functions, etc.) representing the unit procedure constituting the operation of the deductive means 4, hypothesize means 5, and verification means 6, and the customize means 14 for setting (including modifying) the deductive procedure data, hypothesize procedure data, and verification procedure data based on the unit procedure data.

[1-2. Model Base]

Figure 2:
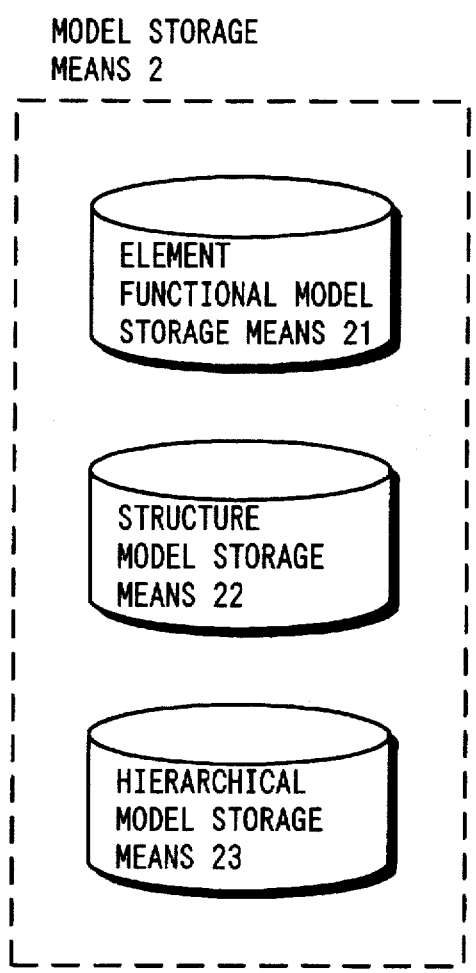
FIG. 2 is a block diagram showing the structure of the model base used in an embodiment of this invention.

As shown in FIG. 2, the model storage means 2 has the element functional model storage means 21 for storing element functional models representing the attributes of the elements constituting the diagnosis target, the structure model storage means 22 for storing structure models representing the relationship among the elements, and the hierarchical model storage means 23 for storing hierarchical models representing the hierarchical relationship between the elements. The deductive means 4, hypothesize means 5, and verification means 6 each operate according to the hierarchical relationship. The model storage means 2 can be built with a standard database management system used to manage such model descriptions as those used in this system or with a frame knowledge base management system suitable for managing declarative knowledge that is organized hierarchically.

[1-3 Deductive Means]

Figure 3:
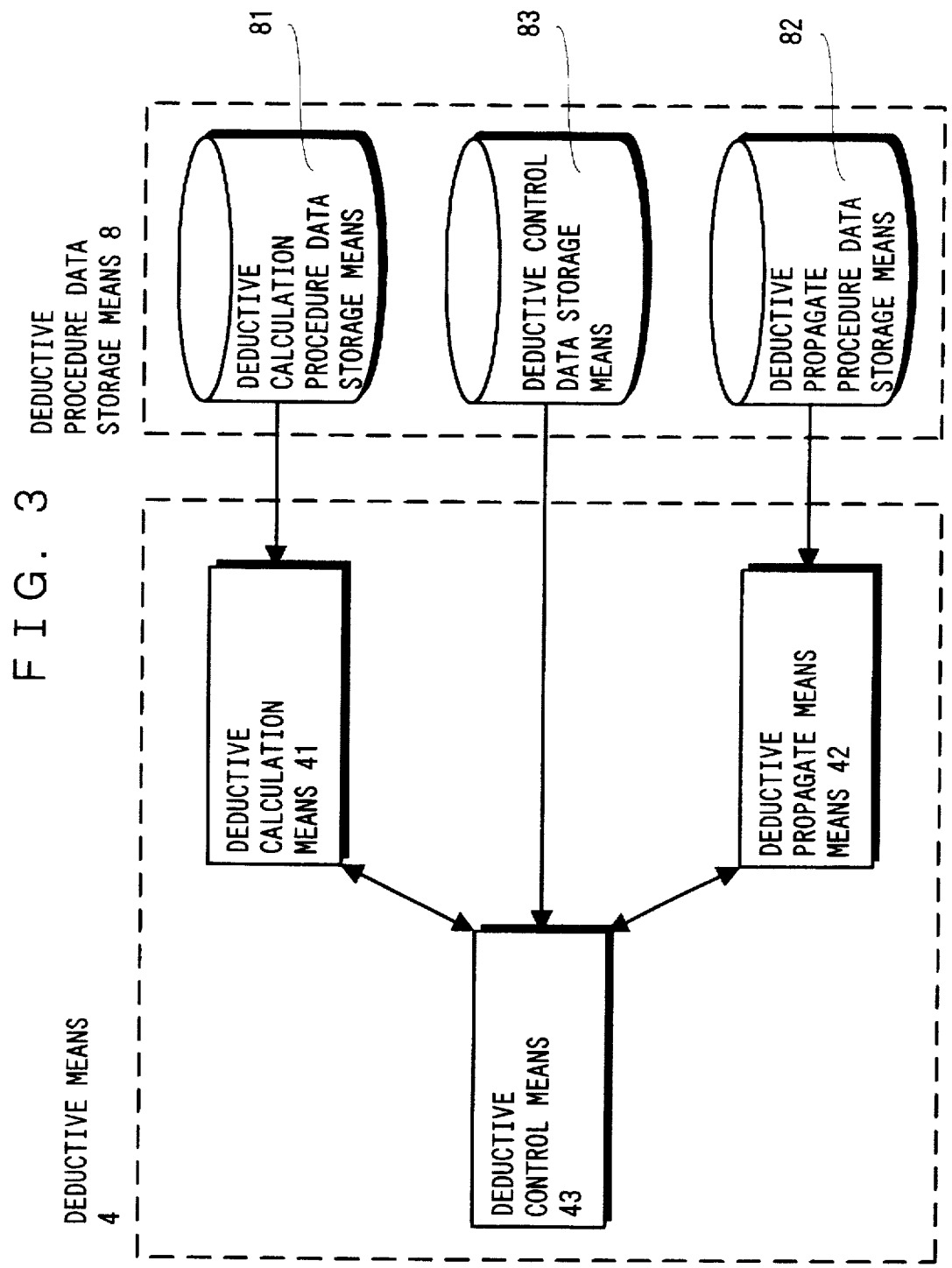
FIG. 3 is a block diagram showing the structure of the deductive means used in an embodiment of this invention.

FIG. 3 is a block diagram showing the structure of the deductive means 4 and the deductive procedure data storage means 8. As shown in this figure, the deductive means 4 has the deductive calculation means 41 for calculating output data anticipated for input data from each element based on the model, the deductive propagate means 42 for propagating the data of the element to other associated elements, and the deductive control means 43 for controlling the coordination between the deductive calculation means 41 and the deductive propagate means 42.

In addition, as shown in the figure, the deductive procedure data storage means 8 includes the deductive calculation procedure data storage means 81 for storing deductive calculation procedure data representing the operation of the deductive calculation means 41, the deductive propagate data storage means 82 for storing deductive propagate data representing the operation of the deductive propagate means 42, and the deductive control data storage means 83 for storing deductive control data representing the control via the deductive control means 43.

[1-4. Verification Means]

Figure 4:
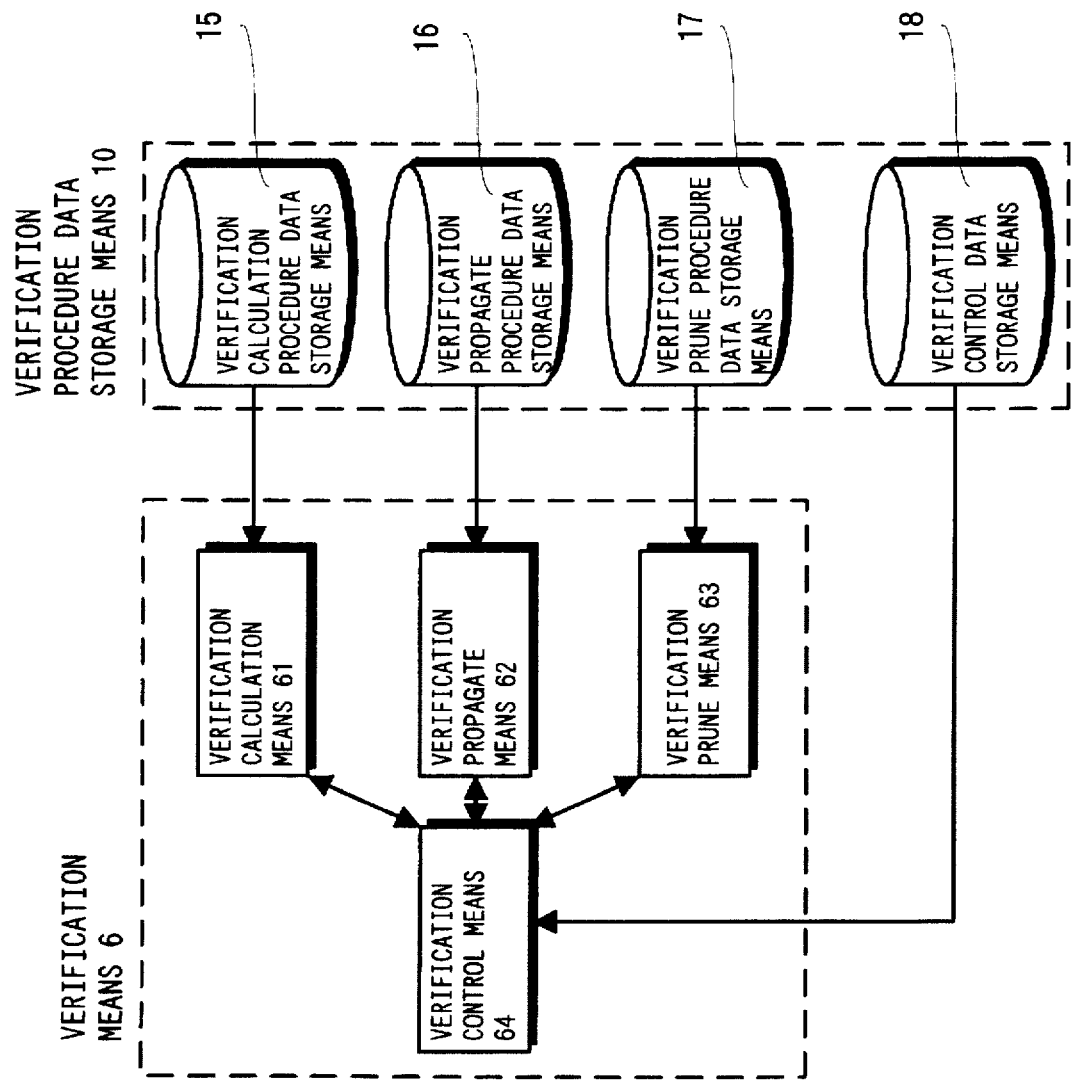
FIG. 4 is a diagram showing the structure of the verification means used in an embodiment of this invention.

FIG. 4 is a block diagram showing the structure of the verification means 6 and the verification procedure data storage means 10. As shown in this figure, the verification means 6 has the verification calculation means 61 for calculating the input data corresponding to the output data of each element of the diagnosis target based on the model, the verification propagate means 62 for propagating the data of the element to other associated elements based on the model, the verification prune means 63 for selecting conclusions according to the specified criteria based on the result of the deduction and the result of the calculation and propagation, and the verification control means 64 for controlling the coordination between the verification propagate means 62 and the verification prune means 63.

As shown in the figure, the verification procedure data storage means 10 has the verification calculation procedure data storage means 15 for storing verification calculation procedure data representing the operation of the verification calculation means 61, the verification propagate procedure data storage means 16 for storing verification propagate procedure data representing the operation of the verification propagate means 62, the verification prune procedure data storage means 17 for storing verification prune procedure data representing the operation of the verification prune means 63, and the verification control data storage means 18 for storing verification control data representing the operation of the verification control means 54.

[1-5. Customize Means]

The customize means 14, though not illustrated, customizes a diagnostic system by setting any of reasoning control data, deductive procedure data (including deductive calculation procedure data, deductive propagate procedure data, and deductive control data), hypothesize procedure data, and verification procedure data (including verification calculation procedure data, verification propagate procedure data, verification prune procedure data, and verification control data) according to user's desire. That is, the user can select a unit procedure and its execution sequence via the customize means from the unit procedure data storage means 13 where unit procedure data constituting the above data is stored. A unit procedure may represent the whole operation of a specific unit such as the operation of the deductive means; in this case, one of the variations most suitable for the user is selected from a plurality of variations.

[1-6. Others]

Working memory, though not illustrated, is provided on this system. Each block of this system stores input/output data, intermediate results, and final results in this working memory to allows other blocks to reference them.

[2. Operation of Embodiment 1]

An embodiment which has a structure described above operates as follows:

[2-1. Diagnostic System Construction]

A diagnostic system is constructed as follows:

[2-1-1. Entering Data to A Model Base]

Figure 5:
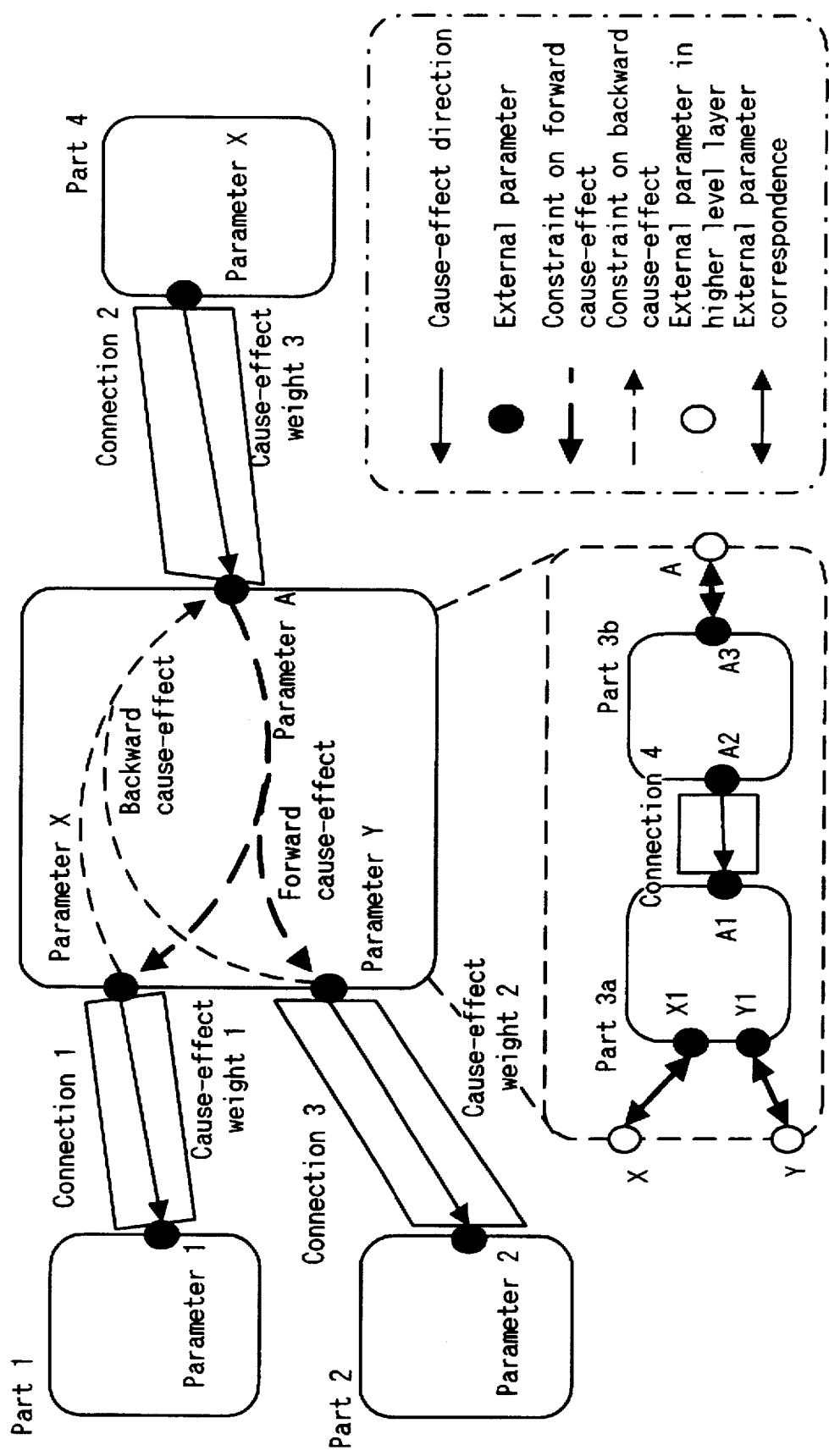
FIG. 5 is a conceptual diagram showing an example of a model used in an embodiment of this invention.

The user enters a model through the model input means 1. FIG. 5 is a conceptual diagram of a model showing the structure of a diagnosis target. In this diagnosis target, parts 1–4 are connected by the connections 1–3 having cause-effect weights 1–3, respectively. The cause-effect relationship among parts 1–4 is defined by the external parameters 1, 2, X, Y, and A. For example, the functions of parts 1–4 are represented by forward cause-effect relational expressions and backward cause-effect relational expressions.

Part 3, which is hierarchically defined, is expanded into a structure where part 3a and part 3b are connected by connection 4.

FIG. 6 shows an example of an element functional model representing part 3. In this example, a part name is defined for the name attribute, external parameter names are defined for the export attribute, local parameter names local to part 3 as well as their values and calculation expressions are defined for the local attribute, the connect names associated with external parameters of part 3 are defined for the connect attribute, external parameter names used as the effect of the cause-effect relation of part 3 are defined for the effect attribute, external parameter names used as the cause of the cause-effect relation of part 3 are defined for the cause attribute, cause-to-effect relational expressions for external parameter values to define the function of part 3 are defined for the forward attribute, and effect-to-cause relational expressions for external parameter values to define the function of part 3 are defined for the backward attribute, respectively.

FIG. 7 shows an example of a structure model associated with connection 1. In this example, a connection name is defined for the name attribute, and part names and external parameter names at both terminations of the connection are defined for the term1 attribute and term2 attribute, respectively.

FIG. 8 shows an example of a hierarchical model of part 3. In this example, a part name for which hierarchical relation is to be defined is defined for the name attribute, the name of a higher hierarchical level part having this part as a lower hierarchical level part is specified or the a_part_of attribute, the names of parts hierarchically lower than this part are defined for the has_a attribute, and the correspondence between the external parameter names of this part and the external parameter names of higher and lower hierarchical level parts is defined for the correspond attribute, respectively.

[2-1-2 Description of A Model]

Figure 9:
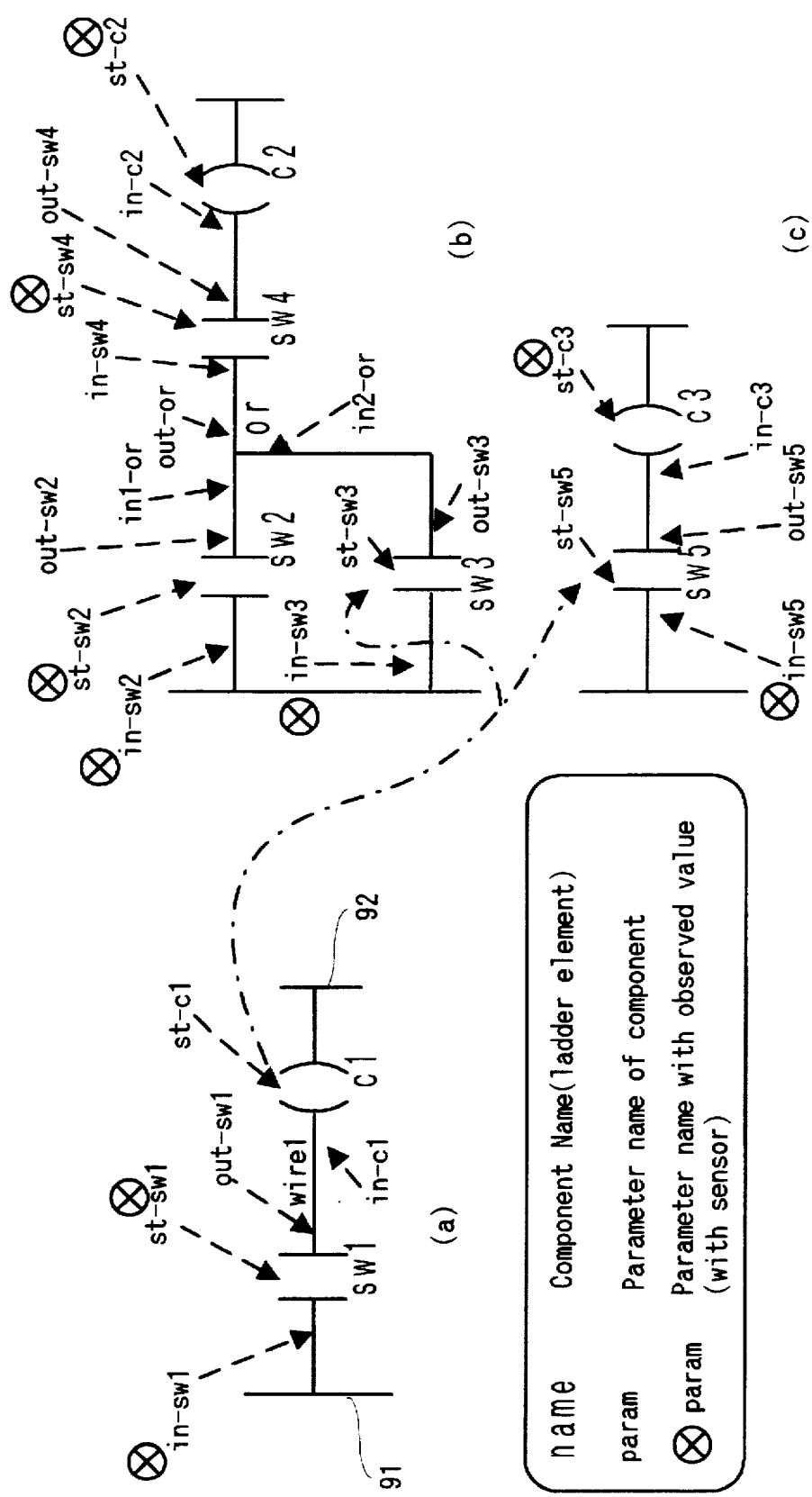
FIG. 9 is a ladder diagram showing the structure of a sequence control device used in an embodiment of this invention.

The following explains a model used as an embodiment in the description. This model represents the operation of a sequence control circuit to be diagnosed. The structure and operation of this sequence control circuit is shown in a form called a ladder diagram (FIG. 9).

A ladder diagram, an English word meaning a relay circuit diagram, shows contacts (correspond to switches) and coils (correspond to excitation valves) laid out according to a specific rule; it also shows signal flows according to a specific rule. That is, contacts and coils are laid out on the specified matrix according to the ladder diagram rule. The vertical lines at the right and left ends are buses, which indicate the start point and the end point. The first contact is connected to the start point, and the coil is connected to the end point. The contact and the coil are connected by a horizontal line, and the horizontal line is connected to another horizontal line by a vertical line.

In the ladder diagram, signals flow as follows. That is, power flows from left to right through the horizontal line, and power is turned on or off according to the make/break state of the contact (logically ANDed). Power flows from top to bottom through the vertical line, and the logical OR of the horizontal line state connected on the left is used as the state of the horizontal line on the right.

Part of the diagram (a), composed of sw1 and c1, is explained. Notice that special symbols are sometimes used in the ladder diagram.

The state of the left vertical line 91 is always 1 (voltage is applied). sw1, which is an element called contact a, has the following characteristics.

That is, when st-sw1=1 (contact a is on), the state of out-sw1 matches the state of in-sw1. That is, if in-sw1=1, then out-sw=1; if in-sw1=0, then out-sw1=0. When st-sw1=0 (contact a is of), the state of out-sw1 is always 0 regardless of the state of in-sw1.

c1 is an element called a coil and, when in-c1=1, st-c1=1 (The coil is excited). When in-c1=0, st-c1=0 (The coil is not excited). It has the following characteristics.

That is, the state of the right vertical line is always 0 (corresponds to the ground). The input parameter in-sw1 at SW1, which is always 1, is represented as a parameter with a sensor. The state parameter st-sw3 at SW1, which is a parameter with a sensor, can be observed. In the diagram, the state parameter st-c1 at c1 is electrically connected to the state parameter st-sw3 at sw3 and to the state parameter st-sw5 at sw5 by dashed lines; they always have the same state value.

FIG. 10 describes an element functional mode of part sw4 of this diagnosis target. FIG. 11 describes a hierarchical model associated with SW4. FIG. 12 describes a structure model representing the connection between "sw4" and "or" in FIG. 9, and FIG. 13 describes a structure model representing the connection between "sw4" and "c2" in FIG. 9, respectively. The meanings of these models are the same as those in FIG. 5. In these models the st-sw4 attribute are defined as sw4 local attributes, and the st-sw4 observation sensor address is defined as sensor001. In addition, the constraint relational expression defining the function of sw4 is composed of IF-THEN relational expressions. For example, the meaning of the first statement in the forward attribute in FIG. 10 is as follows: "If the value of in-sw4 is 1 from t1 to t2 and if the value of st-sw4 is known from t1 to t2, then the value of out-sw4 matches that of st-sw4 from t1 to t2".

[2-1-3. Example of Reserved Words]

Except those shown in FIG. 10, the reserved words (words having defined meanings) which can be described in a constraint relational expression for an element functional model of this system are as follows. For example, add (decimal addition), sub (decimal subtraction), mult (decimal multiplication), div (decimal division), mod (decimal modulo), rem (decimal remainder), and pow (decimal exponentiation) may be used as arithmetic binary functions. plus (positive), minus (negative), and abs (absolute value) may be used as arithmetic unary functions. or (disjunction: Boolean addition), and (conjunction: Boolean multiplication), nor (non-disjunction), nand (non-conjunction), and xor (exclusive-or) may be used as logical binary functions. not (negation) may be used as a logical unary function.

In addition, given (determines whether a parameter value is known or not), equal (determines the equality of an argument value), equal (determines the inequality of an argument value), bind (determines a parameter value), gtn (greater than/determines relation), ltn (less than/determines relation), gte (greater or equal/determines relation), lte (less or equal/determines relations), true (true), and false (false) may be used as constraint predicates. && (logical product predicate), ¦¦ (logical sum predicate) may be used as predicate connectors, and (negation predicate) may be used as a predicate qualifier.

[2-1-4. Basic Task Customization]

In this embodiment, the user can use the customize means 14 to build a diagnostic system according to the contents and nature of a problem to be diagnosed. That is, in this embodiment, unit procedure data constituting the operation of the deductive means 4, hypothesize means 5, and verification means 6 is stored in the unit procedure data storage means 13.

For example, the customize means 14 retrieves processing procedure function names from unit procedure data, and stores retrieved processing function names in the deductive procedure data storage means 8. The deductive means 4 can identify, at execution time, the processing function names that have been set.

FIG. 14 shows an example of unit procedure data. In this example, ded-func1, ded-func2, and ded-func3 are defined for the deductive means 4 as selectable target functions, hyp-func1 and hyp-func2 are defined for the hypothesize means 5 as selectable target functions, and ver-func1, ver-func2, ver-func3, and ver-func4 are defined for the verification means 6 as selectable target functions.

For the user to build a model-based diagnostic system, he uses the customize means 14 to select unit procedure data in a sequence he wishes. Then, the customize means 14 stores user-selected unit procedure data, or data which identifies unit procedure data, in the deductive procedure data storage means 8, hypothesize procedure data storage means 9, and verification procedure data storage means 10, respectively.

FIG. 15 shows an example of deductive procedure data. In this example, ded-func1 is specified as the target function ("target"). This indicates the name of the function that is actually called by the deductive means. In this manner, with the use of the customize means 14, the user can change the basic task (a series of procedures) as he likes by changing the target function name for deductive procedure data. In addition to the target function name, an option ('options') specifying the operation mode of each task may be specified at the same time. Each task has a set of options that can be specified. Hypothesize procedure data and verification procedure data may also be customized in the same manner.

[2-1-5. Reasoning Control Customization]

The customize means 14 also enables the user to set up the coordination among the deductive means 4, hypothesize means 5, and verification means 6 (that is, the sequence of operation or the condition under which control is passed among means). In this case, the customize means 14 stores user-selected coordination data in the reasoning control data storage means 12.

An embodiment of this control and customization is as follows: That is, reasoning control data is defined as character strings (simple reserved words such as the if, for, or while statement) each describing the call of a function defining a basic task corresponding to the deductive means 4, hypothesize means 5, or verification means 6. By defining reasoning control data in this manner, the reasoning execution means need only to interpret these character strings (interpretive execution procedures corresponding to the above reserved words are included) and to call the functions of each basic task. This type of interpretive execution may be implemented by a serially-interpretive execution processing system (interpreter) or by a batch compilation execution processing system (compiler). In a typical embodiment by a compiler, each basic task, which is coded in the C language with the reasoning execution means as the main function of the reasoning process, is compiled, linked, and executed.

FIG. 16 is an example of reasoning control data associated with a model-based diagnostic system to be applied to the sequence control system mentioned above. The symbols used in FIG. 16 have the following meanings:

"input" is a reserved word meaning that a command is entered from the input/output means which is not illustrated. "call" is a reserved word specifying the call of a basic task whose name follows the reserved word. The basic task is one of basic tasks corresponding to the deductive means 4, hypothesize means 5, or verification means 6. The following task names are defined.

"deductive_means" is a task name corresponding to the deductive means 4, "hypothesize_means" corresponding to the hypothesize means 5, and "verification_means" corresponding to the verification means 6, respectively. In addition, "deductive_calc_means" is a sub-basic task name corresponding to the deductive calculation means 41, "deductive_propagate_means" corresponding to the deductive propagate means 42, "verification_calc_means" corresponding to the verification calculation means 61, "verification_propagate_means" corresponding to the verification propagate means 62, and "verification_prune_means" corresponding to the verification prune means 63. A sub-basic task means a task which is a component of a basic task.

"if (...) then...else..." is a reserved word specifying a conditional branch, "status" is a reserved word used to reference the status of the execution result of a task or sub-basic task whose name follows the reserved word, "==" is a reserved word specifying equivalence, "goto" is a reserved word specifying a jump to the label name which follows the reserved word, and an uppercase label name is a reserved word specifying the jump destination.

"output" is a reserved word causing the following data to be output to the conclusion output means 7. It has the following variations: "diagnosis" is a reserved word specifying the output of diagnosis results, and "error" is a reserved word specifying the output of error information (error messages).

Data transfer among blocks shown in FIGS. 1–4 is done via working memory mentioned above. Data is distinguished by the type of data stored in working memory. That is, by defining a reserved word for each type of input/output data for basic tasks and sub-basic tasks, execution is controlled consistently.

The basic format of data in this working memory is "datum (data-type, value, label, dependency). The format of "value" is not fixed; it depends on the data type. "label" is used when the value of the parameter changes from hypothesis to hypothesis and from time to time. "dependency" specifies data on which the datum (ie. reasoning result) depends.

[2-1-6. Sub-Basic Task Customization]

Customization which is done by selecting basic tasks of the deductive means 4, hypothesize means 5, and verification means 6 may also be performed for sub-basic tasks such as the deductive calculation means 41 which constitutes the means 4, 5, or 6, by selecting sub-basic tasks.

That is, the deductive means 4 can be customized by the deductive calculation means 41, deductive propagate means 42, or deductive control means 43. Similarly, the verification means 6 can be customized by the verification calculation means 61, verification propagate means 62, verification prune means 63, or verification control means 64.

In this case, as with basic tasks, procedures for each means, which are parts constituting the operation, are stored in the unit procedure data storage means so that the user can select desired unit procedure data with the customize means.

[2-2. Operation of Constructed Diagnosis System]

Figure 17:
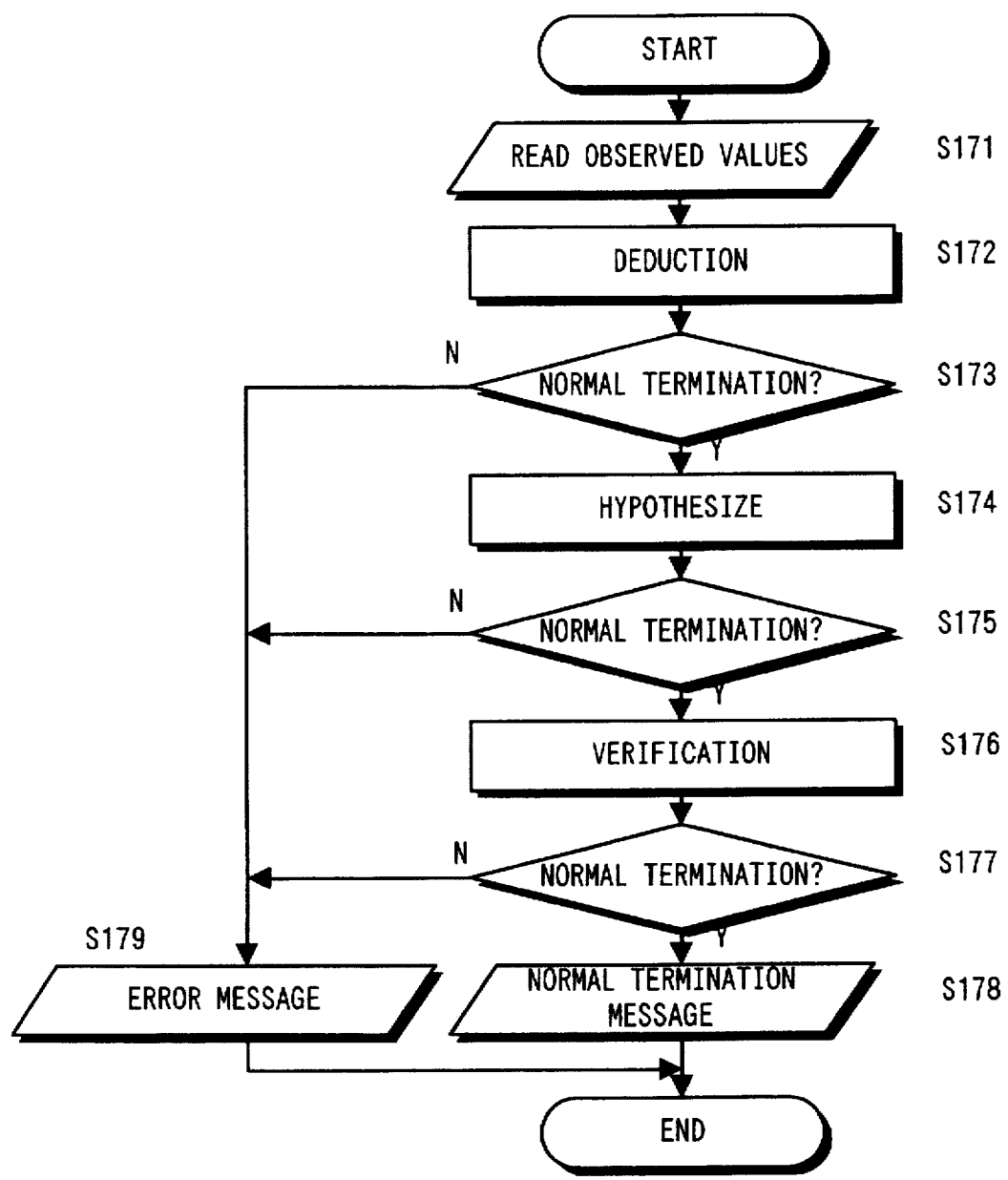
FIG. 17 is a flowchart showing a reasoning procedure corresponding to reasoning control data in FIG. 16.

A diagnostic system which is built by customization as described above performs reasoning according to the procedure described below. FIG. 17 is a flowchart showing the reasoning procedure corresponding to reasoning control data shown in FIG. 16.

[2-2-1. Procedure Outline]

In this procedure, the observed value input means 3 reads observed values including a value indicating an abnormal symptom (step 171), then the deductive means 4 performs deduction (step 172). This deduction is performed by the same direction as the actual propagating direction between the elements in the diagnosis target based on the model. Each value which should occur in the effect-side of the cause-effect sequences is calculated based on values in the cause-side of sequence.

Upon normal termination of deduction (step 173), the hypothesize means 13 generates an abnormality hypothesis candidate (step 174). In this process, values which do not match with observed values are didected from values which are deducted and exist in the end of cause-effect sequences. Then every elements in the cause-side courses of the detected values is extracted as abnormality hypothesis candidate. Candidates include all elements which may behaves differ from the model.

Upon normal termination of hypothesis generation (step 175), the verification means 6 verifies the hypothesis and generates a conclusion (step 176). In this verification, all elements which exists in the cause-side course of end values which match with observed values are selected then these selected elements are removed from hypothesis. The verification removes elements behaves same as the model from the hypothesis and the rest of hypothesis is the conclusion.

Upon normal termination of hypothesis verification (step 177), the conclusion output means 7 outputs a conclusion associated with the cause of the abnormality as the final reasoning result (step 178) and ends reasoning. When an abnormal termination is detected in steps 173, 175, or 177, an error message is issued (step 179) and reasoning ends. The following describes this procedure more in details.

[2-2-2. Input of Observed Values]

Assume that, in the diagnosis target mentioned above, observed values in-sw1=1, st-sw1=1, in-sw2=1, st-sw2=0, st-sw4=1, st-c2=0, in-sw3=1, in-sw5=1, and st-C3=1 are observed. In these observed values, st-c2=0 is an abnormal symptom because it should be st-c2=1. If this kind of abnormal symptom is entered (step 171), data about an abnormal symptom is stored in the working memory as follows:

data(symptom, st-c2=0, [1.5], ())

where, "symptom" is a data type indicating an abnormal symptom, st-c2=0 is a value, |1.5| is a label indicating the time interval 1–5, and ( ) indicates data without dependency.

Also assume that other data is stored in working memory as follows:

data(obs, in-sw1=1, |1,5| ( ))
data(obs, st-c3=1, |1,5| ( ))

|2-2-3. Deduction|

Figure 18:
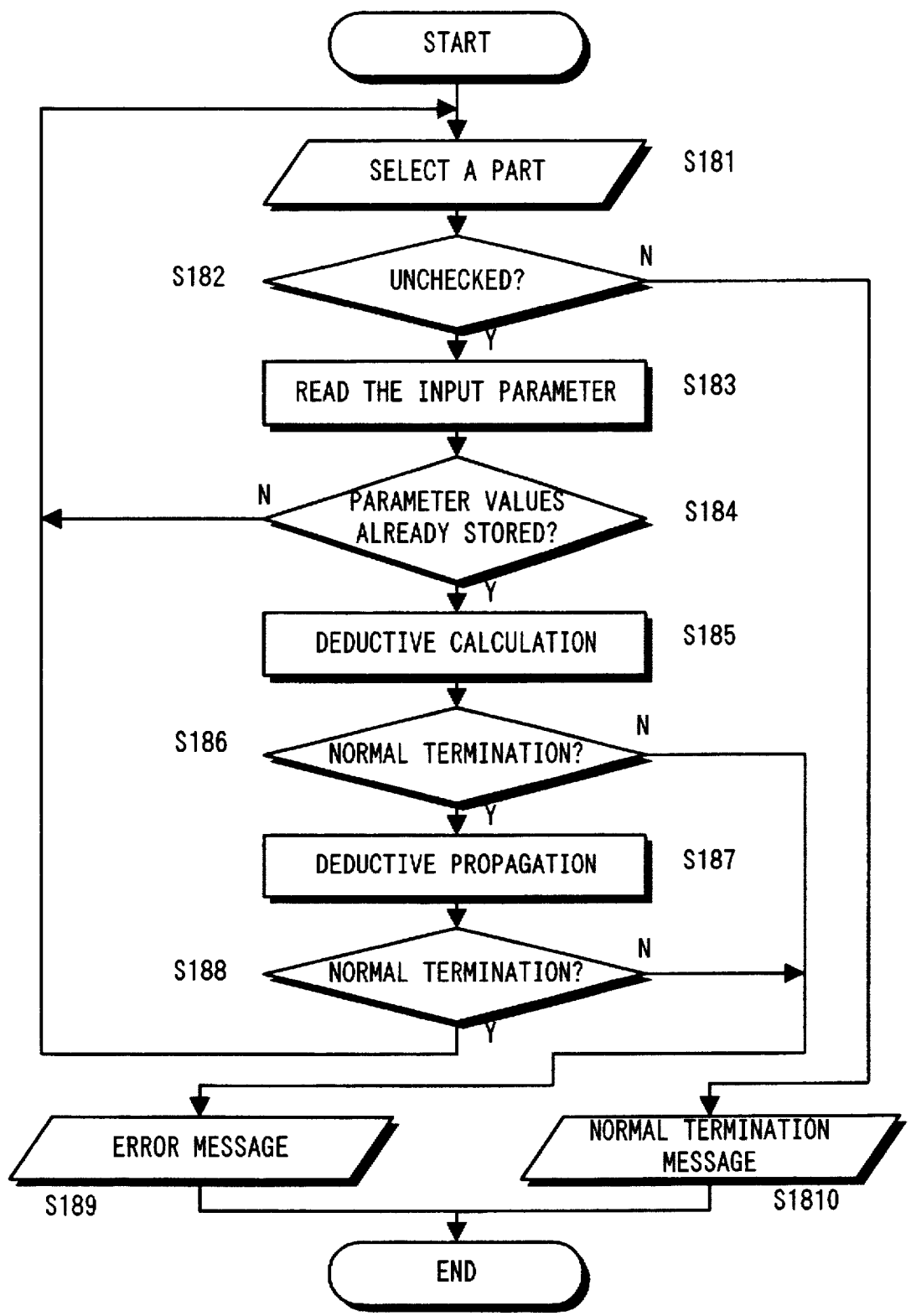
FIG. 18 is a flowchart showing a deductive procedure defined by deduction procedure data in an embodiment of this invention.

Then, control is passed to the deductive means 4 (step 172) for performing deduction. FIG. 18 is an example of flowchart showing the deduction procedure defined by deductive procedure data.

In this procedure, sw1 is first selected as a part (step 181). Then, it is judged whether or not this part has already been checked (step 182). Because the part sw1 has not yet been checked for the deductive means 4, the input parameter specified for the cause attribute is read from the element functional module storage means 21 (step 183). The element functional model of sw1 is the same as that for sw4 shown in FIG. 10, and in-sw1 and st-sw1 are obtained (FIG. 9).

Then, a check is made to see if the input parameter values are in working memory (step 184). Because in-sw1 and st-sw1 are stored in working memory as observed values, control is passed to the deductive calculation means 41 for performing deductive calculation (step 185).

|2-2-3-1. Deductive Calculation|

FIG. 19 is a flowchart showing the procedure for deductive calculation defined by deductive calculation procedure data. Actually, this is executed by a processing procedure function. This function is selected from unit procedure data by the customize means, and is set up as deductive calculation procedure data.

In this procedure, the element functional model of sw1 is referenced, and a constraint expression having the forward attribute is selected (step 191). Because the element functional model for sw1 is similar to that of sw4 shown in FIG. 10, the following constraint expression is selected:

```
IF &&(equal{in-sw1,1,|t1,t2|),
     given(st-sw1, |t1, t2|))
THEN bind(out-sw1, st-sw1,|t1,t2|)
```

Then, it is judged whether or not the selected constraint expression has not yet been checked (step 192). Because this constraint expression has not yet been checked, reference is made to working storage and the above IF statement is evaluated (step 193). This generates t1=1, t2=5, and st-sw1= 1.

Next, a check is made to see if the IF statement is true (step 194). If it is false, the procedure is repeated from step 191; if it is true, the statement following THEN is evaluated (step 195). This determines the value of out-sw1, and the value is stored in working memory as follows:

data(calc,out-sw1=1, [1,5]; [sw1], ({in-sw1=1, st-sw1= 1}))

where, calc is the type of deductive calculation result, and out-sw1=1 is the calculated value. [1,5]; [sw1] are two labels; one of them is for the time and the other is for the functional element name. ({in-sw1=1, st-sw=1}) is a dependency definition indicating that in-sw1=1 and st-sw=1 are used as the condition.

sw1 in the label means that the calculation result of out-sw1=1 is valid if sw1 is normal. FIG. 20 is a conceptual diagram showing the state in which the value has been calculated for the label and dependency.

Then, the result is output, and deductive calculation ends (step 196). If the constraint expression is determined as checked in step 192, an error message is issued and deductive calculation ends.

|2-2-3-2. Deductive Propagation|

When deductive calculation is terminated normally (step 186), control is passed to the deductive propagate means 42 for performing deductive propagation (step 187). FIG. 21 is a flowchart showing the procedure for deductive propagation defined by deductive propagate procedure data. Actually, this is performed by a processing procedure function. This function is selected from unit procedure data by the customize means 14, and is set up as deductive propagate procedure data..

In this procedure, one of connections associated with out-sw1, which is the result of the preceding deductive calculation, is selected from the connect attribute of the functional model base of sw1 (step 211). Because the element functional model of sw1 is the same as that of sw4 shown in FIG. 10, the connection wire1 is selected.

Then, it is judged whether or not the selected connection has not yet been checked for the deductive means 4 (step 212). Because no check has been made for the selected connection, reference is made to the term1 attribute and term2 attribute of the structure model of wire1 and the part name and parameter name of the connection destination of sw1 are obtained (step 213). The structure model for wire1 is the same as for connection 1 and connection 2 in FIGS. 12 and 13, and as a result, part 1 and parameter name in-c1 are obtained.

When the part name and parameter name of the connection destination are obtained (step 214), the result of deductive calculation is assigned to the part parameter of the connection destination and is stored in working memory. The result of the preceding deductive calculation, out-sw=1, is assigned as the in-c1 value of c1, and is stored in working memory as follows:

data(calc,in-c1=1, [1,5]; [t, sw1], ({out-sw1=1,})

where, calc is the type of deductive propagate result, and in-c1=1 is the calculated value. [1,5]; [t, sw1] are two labels added; one of them is for the time and the other is for the connection name. ({out-sw1=1,}) is a dependency definition indicating that out-sw1=1 is used as the condition.

"t" added to the label indicates that the propagation result of in-c1=1 is valid if the topology (topology) of the diagnosis target is normal. In other words, wire1 may be added to the label because it is used as the topology. In this embodiment, since the connections themselves are assumed to have no fault, all the connections are described as t. FIG. 22 is a conceptual diagram showing the state in which the value has been calculated for the label and dependency by the deductive propagate means 42.

From step 211, a check is made similarly for connections. If a connection which has not yet been checked is no longer found in step 212, the normal termination message is issued (step 217) and deductive propagation ends. If no part name and parameter are obtained in step 214, an error message is issued (step 216) and deductive propagation ends.

When deductive propagation ends normally (step 188), processing is repeated from step 181 as described above. If there is no part to be checked for the deductive means 4 (step 181), the result is output (step 1810) and deduction ends. However, if processing is terminated abnormally in any step (steps 186, 188), an error message is issued and deduction ends (step 189).

Figure 23:
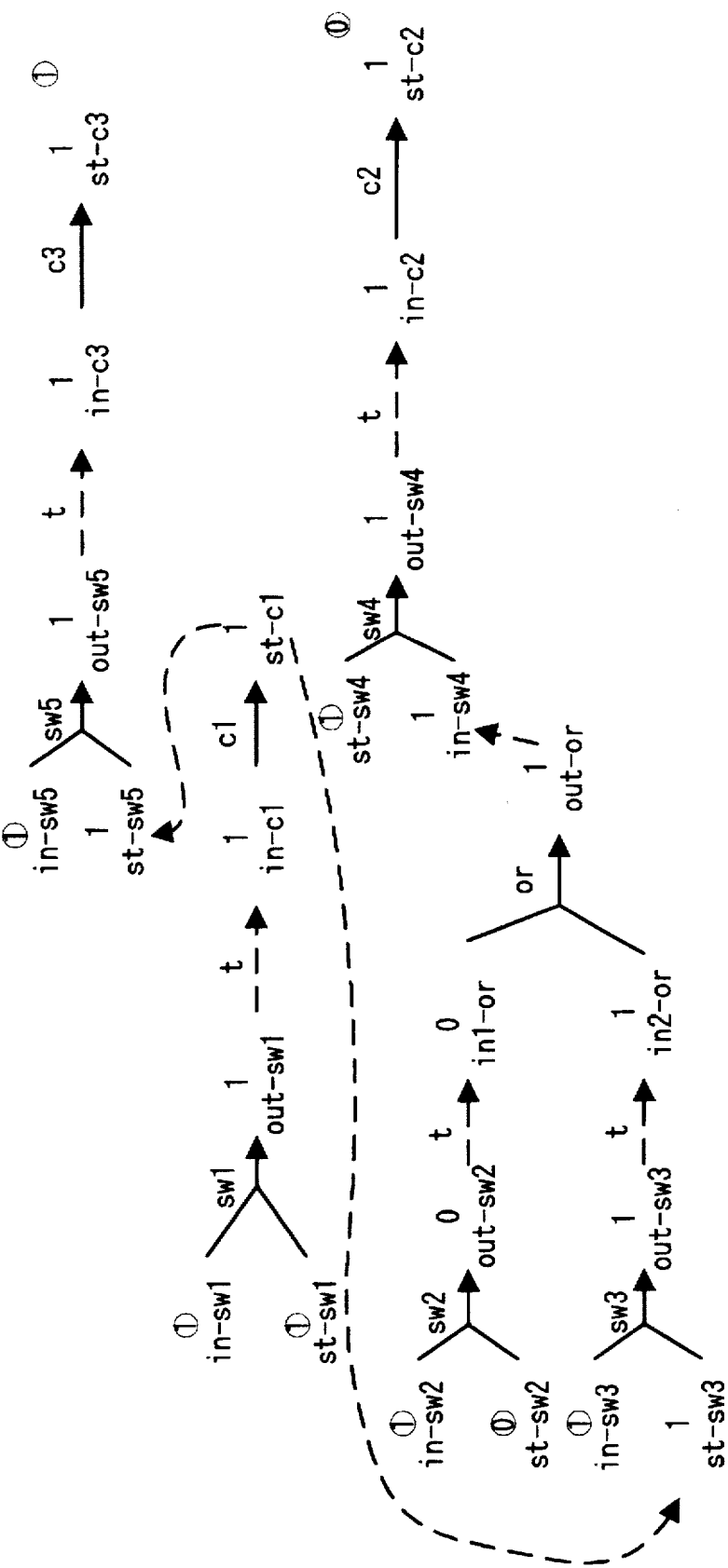
FIG. 23 is a diagram showing working memory at the end of deduction in an embodiment of this invention.

FIG. 23 shows the state of working memory at the end of deduction, using the representation used in FIGS. 20 and 22. The values indicated by are observed values, and others are values calculated through deductive calculation and deductive propagation.

|2-2-4. Hypothesize|

Figure 24:
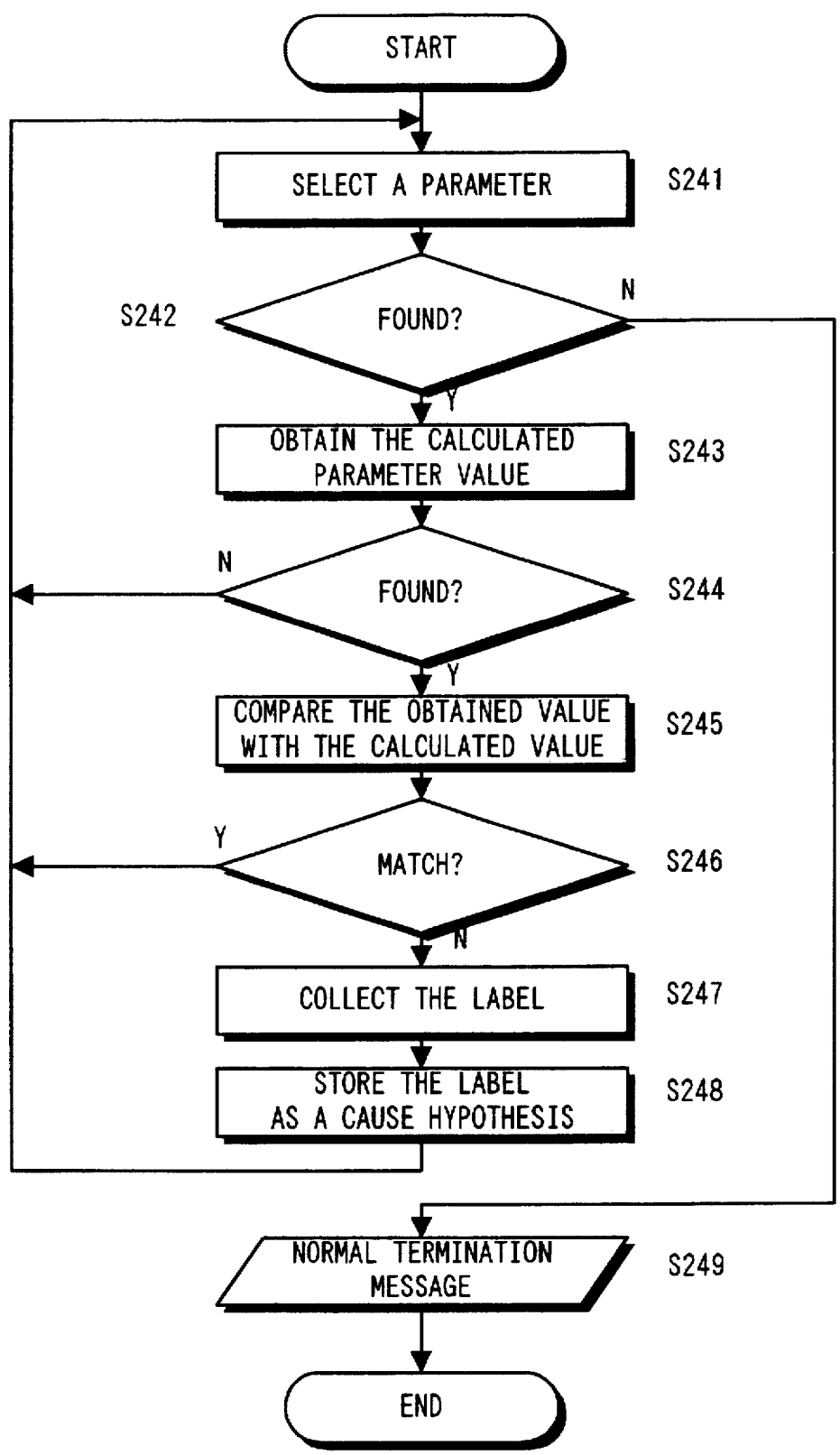
FIG. 24 is a flowchart showing a hypothesize procedure defined by hypothesize procedure data in an embodiment of this invention.

When deduction is terminated normally (step 173), control is passed to the hypothesize means 5 for hypothesis generation (step 174). FIG. 24 is a flowchart showing the procedure of hypothesize processing defined by hypothesize procedure data. Actually, this is performed by a processing procedure function. This function is selected from unit procedure data by the customize means 14, and is set up as hypothesize procedure data.

In this procedure, st-c3, which is one of observed value parameters stored in working memory, is selected (step 241). Because the parameter is found (step 242), the parameter value calculated through deduction is obtained from working memory as follows (step 243):

data(calc,st-c3=1, |1,5|; |sw1,c1,sw5,c3,t|, ({in-c3}))

The label |sw1,c1,sw5,c3,t| indicates that the deductive means 4 calculates st-c3=1 assuming that parts sw1, c1, sw5, and c3 are normal and that the topology is normal.

Because this calculated value is found (step 244), the observed value of st-c3 is compared with the above calculated value (step 245). As described above, the observed value is stored in working memory as follows:

data(obs,st-c3=1, |1,5|, ( ))

Because these two values match (step 246), the procedure is repeated from step 241. This time, step 242 through step 245 are executed similarly for the parameter st-c2. The calculated value through the deductive means 4 and the observed value are stored in working memory as follows:

data(calc,st-c2=1,|1,5|;|sw1,c1,sw3,sw2,or,sw4,c2,t|, ({in-c2}))
data(obs,st-c2=0,|1,5|())

If the two values do not match in step 246, the data structure of the parameter value in working memory which was calculated by the deductive means 4 is examined, and the label is collected. In this example the label of st-c2=1 is collected from working memory. That is, |sw1,c1,sw3,sw2, or,sw4,c2,t| is obtained.

Next, this label is stored in working memory as an abnormal hypothesis (step 248). This indicates that at least one of parts or connections contained in this label is failing. In this case, since the topology itself is assumed to have no fault, the abnormality hypothesis, created with "t" removed from the label, is stored in working memory as shown below, and control returns to step 241:

data(diagnosis, [sw1,c1,sw3,sw2,or,sw4,c2], [1,5], ( ))

Figure 25:
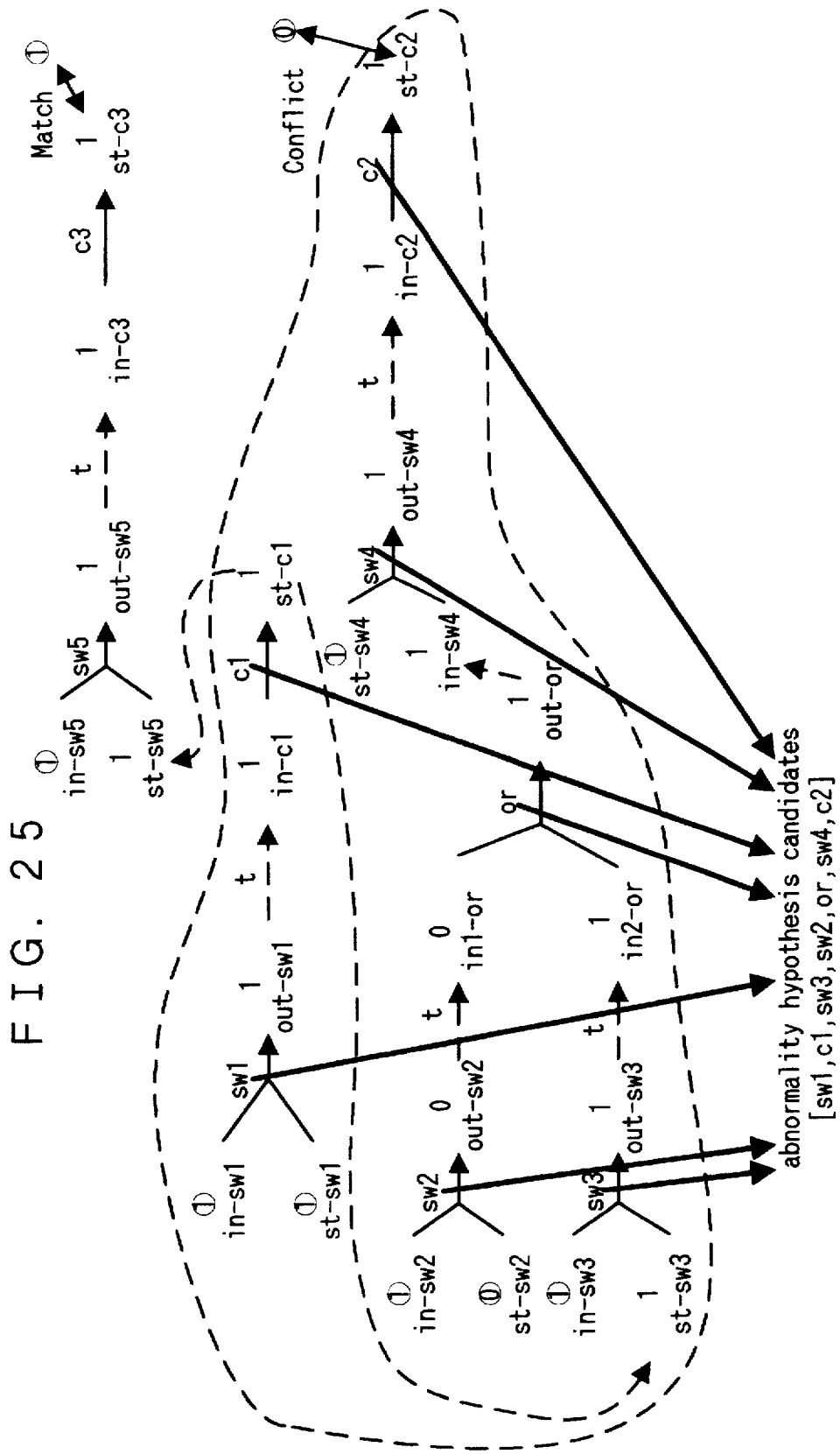
FIG. 25 is a diagram showing the detection of an abnormality hypothesis from a conflict between calculation results and observed values.

After this procedure is repeated and all the observed values are processed, the normal termination message is issued (step 249) and hypothesize processing ends. In this example, no abnormality hypothesis other than the one described above was found. FIG. 25 briefly shows the result of the above processing where an abnormality hypothesis was found from a conflict between the calculated result and observed value.

[2-2-5. Verification]

Figure 26:
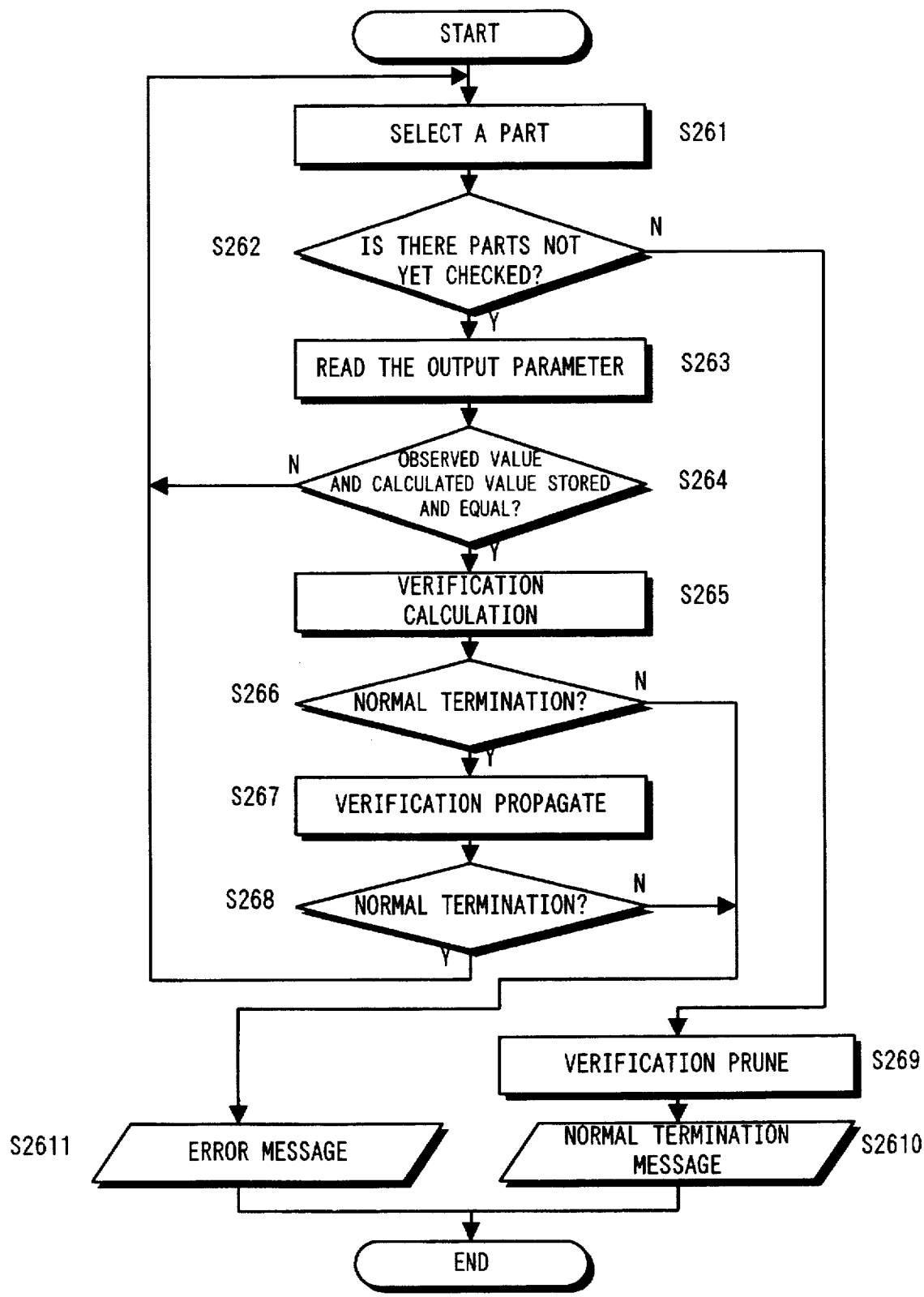
FIG. 26 is a flowchart showing a verification procedure defined by verification procedure data in an embodiment of this invention.

When hypothesize processing is terminated normally (step 175), control is passed to the verification means 6 for performing verification (step 176). FIG. 26 is a flowchart showing the procedure for verification defined by verification procedure data. This procedure is similar to the deductive procedure shown in FIG. 18. However, deductive calculation is executed in the cause-effect sequence from the input parameter to the output parameter, while verification calculation is executed in the effect-cause sequence from the output parameter to the input parameter. In addition, unlike deduction, the verification prune sub-basic task is executed.

That is, part c3 is selected first (step 261) during verification. Because c3 has not yet been checked for the verification means 6 (step 262), the parameter (output parameter) specified for the effect attribute is read from the element functional model (step 263). The element functional model of part c3 is defined in the same format as that of sw4 in FIG. 10. Although the details are omitted here, st-c3 is obtained as the result (See FIG. 10). And, both the observed value of the output parameter and the value calculated through deduction are stored in working memory, and it is judged that both values match (step 264). In this case, the observed value and the value calculated through deduction, which are equal, are stored in working memory as follows:

data(calc,st-c3=1, |1,5|; |sw1,c1,sw5,c3,t|, ({in-c3}))

Then, control is passed to the verification calculation means 61 for performing verification calculation (step 265).

[2-2-5-1 Verification Calculation]

The verification calculation procedure defined by verification calculation procedure data is executed by a processing procedure function. This function is selected from unit procedure data by the customize means 14, and is set up as verification calculation processing data.

The verification calculation procedure is similar to the deductive calculation procedure shown in FIG. 19. However, reference is made in deductive calculation to the forward attribute of the element functional model to perform calculation in the forward cause-effect sequence, while reference is made in verification calculation to the backward attribute of the functional model base to perform calculation in the backward cause-effect sequence. For these two procedures, the descriptive format for the forward attribute and that for the backward attribute are the same. Therefore, the procedure for verification calculation, which is the same as that for the deductive calculation, is described here.

When verification calculation is terminated normally, the following calculated parameter value is stored in working memory:

data(veri,in-c3=1, [1,5]; [c3], ({st-c3=1}))

veri is a type indicating that the result has been generated by the verification means 6. It is distinguished from the result of deductive calculation of the deductive means which is identified by calc. in-c3=1 is the calculated value. [1,5]; [c3] indicates that there are two labels: one is for the time and the other is for the connection name. ({st-c3=1}) is a dependency definition indicating that st-c3=1 is used as the condition.

When verification calculation is terminated normally (step 266), control is passed to the verification propagate means 62 for performing verification propagation (step 267).

[2-2-5-2. Verification Propagation]

The procedure for verification propagation is executed by a processing procedure function. An example of this function is the same as that in FIG. 21 and, therefore, the description is omitted here. When verification propagation is terminated normally, a parameter value is calculated and stored in working memory as follows:

data(veri,out-sw=1, |1,5|; |t,c3|, ({in-c3}))

veri is a type indicating that the value is the result of verification propagation (it has been generated by the verification means 6). out-sw=1 is the calculated value. [1,5]; |t,c3| indicates that there are two labels: one is for the time and the other is for the connection name. ({in-c3=1}) is a dependency definition indicating that in-c3=1 is used as the condition.

As mentioned before, "t" added to the label indicates that the propagation result of out-sw5=1 is valid if the topology (topology) of the diagnosis target is normal.

[2-2-5-3. Verification Pruning]

When verification propagation is terminated normally (step 268), processing is repeated again from step 261. The description of processing is not given here because it is the same as the above description. When all parts have been checked for the verification means in step 262, verification pruning is performed (step 269).

Figure 27:
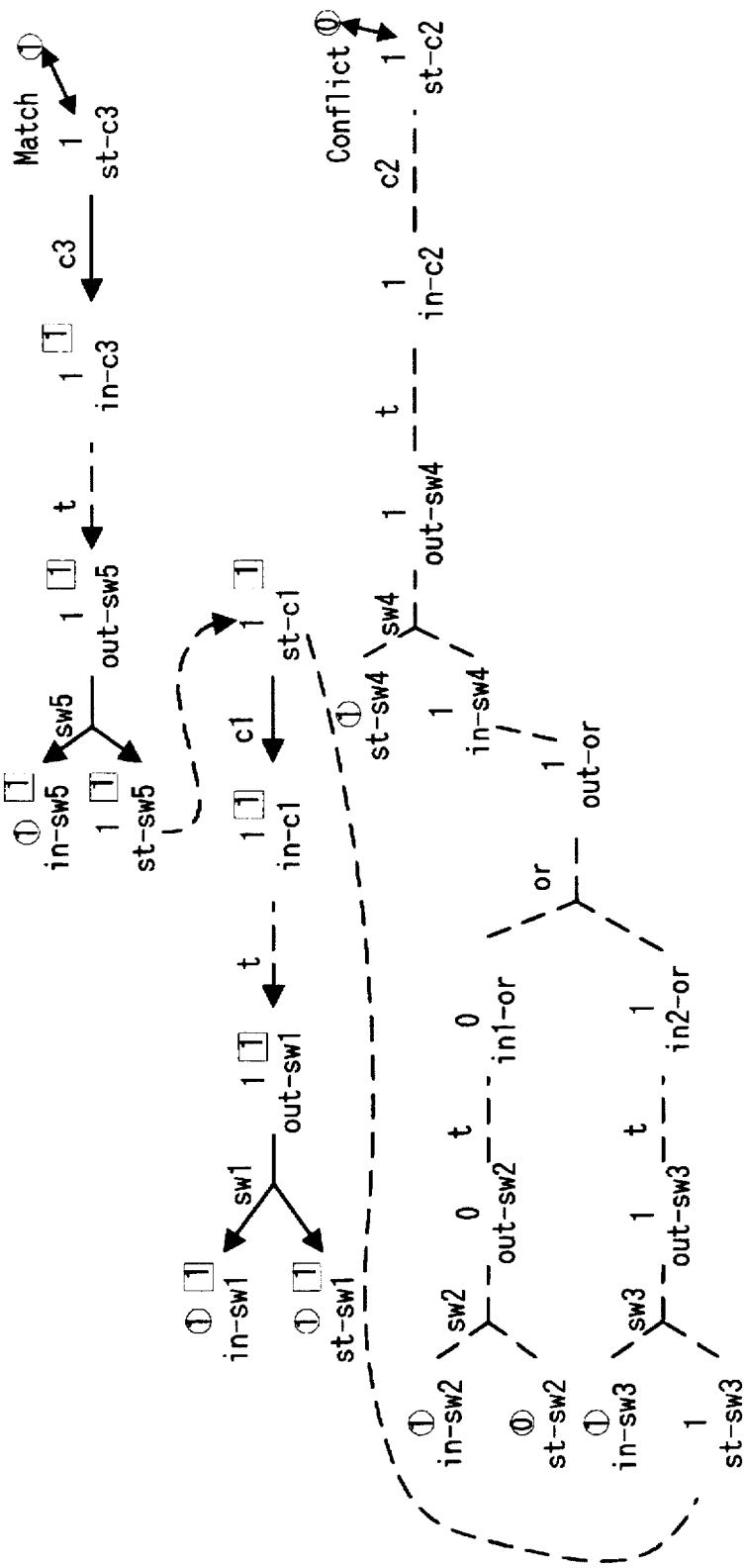
FIG. 27 is a diagram showing working memory at the start of verification pruning.

FIG. 27 shows the state of working memory at the start of verification pruning in step 269, using the representation used in FIGS. 20 and 22. The values indicated by are values calculated through verification, the values indicated by are observed values, and others are values calculated through deduction.

Figure 28:
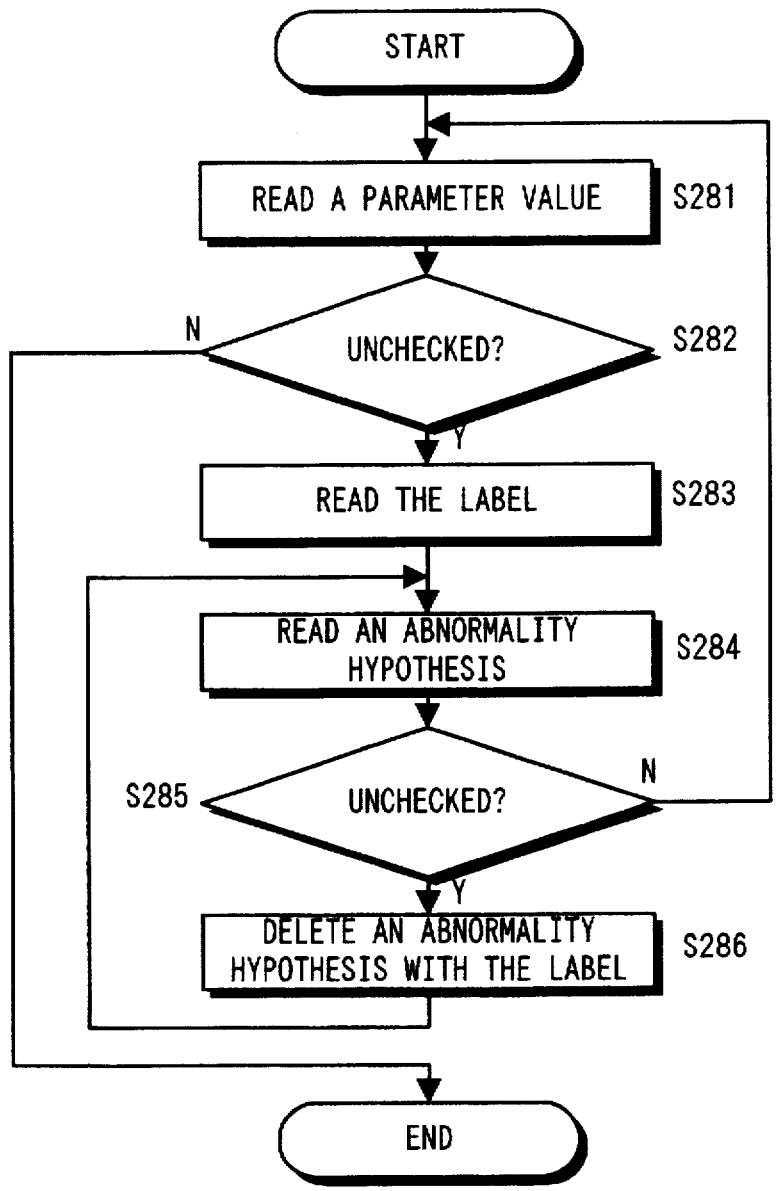
FIG. 28 is a flowchart showing a verification prune procedure defined by verification prune procedure data in an embodiment of this invention.

In step 269, control is passed to the verification prune means 63 for performing verification pruning. FIG. 28 is a flowchart indicating verification pruning defined by verification prune procedure data.

In this procedure, a parameter value calculated through verification calculation and verification propagation is read from working memory (step 281). The parameter value in-sw1=1 is obtained. Its data structure in working memory is as follows:

data(veri,in-sw=1, |1,5|; |sw1,c1,sw5,c3,t| ({out-sw1= 1}))

where, |sw1,c1,sw5,c3,t| is a label.

When an unchecked parameter value is obtained (step 282), the data structure of the parameter value in working memory is examined and its label is read (step 283). Here, |sw1,c1,sw5,c3,t| is read as the label of in-sw1=1. Then, an abnormality hypothesis generated during hypothesize processing is read from working memory (step 284).

As described before, its data structure in working memory is as follows:

data(diagnosis, |sw1,c1,sw3,sw2,or,sw4,c2|, |1,5|, ( )).

When an unchecked abnormality hypothesis is read (step 285), it is deleted if it is contained in the parameter value with the above label, and is stored in working memory if it is not contained (step 286). Here, an abnormality hypothesis |sw1,c1,sw3,sw2,or,sw4,c2| is deleted if it is contained in the parameter value with the label in-sw1=1, and a new abnormality hypothesis is stored in working memory as follows:

data(diagnosis, |sw3,sw2,or,sw4,c2|, |1,5|, ( )).

The old abnormality hypothesis shown above is deleted from working memory.

This deletion method is based on the "minimum diagnosis" concept. That is, when a calculated value matches an observed value, there is a high probability that all the parts affecting the calculated parameter value are normal and, therefore, those parts may be deleted from failure cause candidates.

The same processing is performed (FIG. 28) and, when verification pruning is terminated, only pruned abnormality hypotheses remain. If the verification prune means is constructed such that the parts whose failure probability is low, such as "or" parts, are deleted, the precision of verification pruning will increase and it will become possible to generate only |sw3,sw2,sw4,c2| as the abnormality hypothesis.

Figure 29:
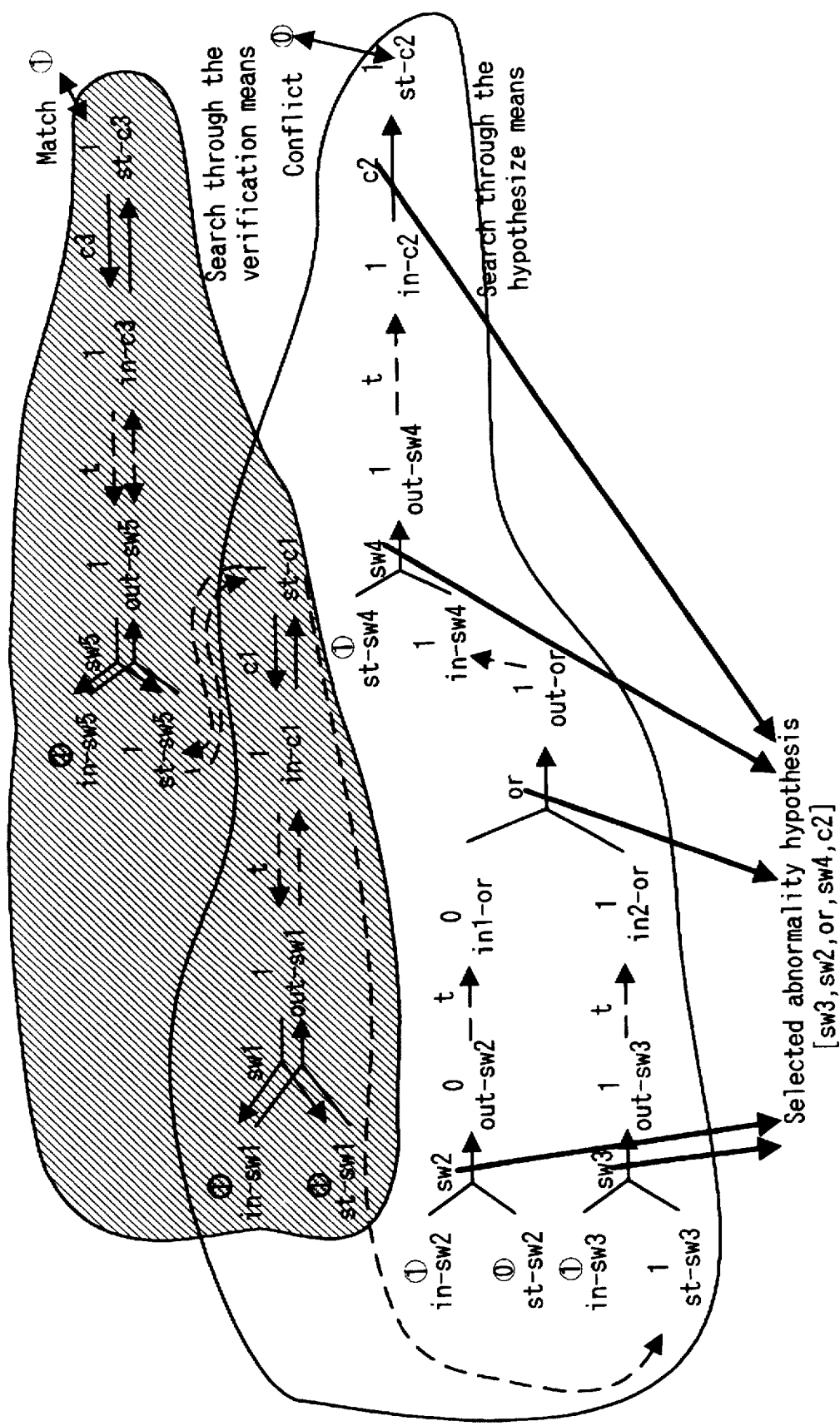
FIG. 29 is a diagram showing working memory at the end of verification pruning.

FIG. 29 shows the state of working memory at the end of verification pruning, using the representation used in FIGS. 20 and 22.

When the normal termination message is issued and the verification means ends, the conclusion output means 7 outputs information about abnormality hypothesis as the conclusion of reasoning by reading data with the data type of "diagnosis" from working memory (step 178) and then reasoning ends.

[3. Effect of Embodiment 1]

Because the deductive means 4, hypothesize means 5, and verification means 6, which constitute a model-based diagnostic system, can be customized to suit the needs of diagnosis targets according to their nature as explained in this embodiment, the cost and time required to build a model-based diagnostic system will be reduced.

In particular, as shown in this embodiment, models may be represented easily because element functional models, structure models, and hierarchical models are formulated and because simply-structured model forms are provided. A hierarchically structured model used in this embodiment allows the user, with the use of higher-level function and structure information, to find parts where there is a high probability of failures and then, with the use of detailed function and structure information, further narrows down to the precise candidates, making reasoning more efficient.

According to this embodiment, the user can customize a system not only by basic tasks but also by sub-basic tasks (for example, deductive calculation means 41 and deductive propagate means 42 constituting the deductive means 4). Therefore, the user can customize a system according to the requested specifications while building it in the building-block method.

As shown in this embodiment, the user can customize the control of coordination between the deductive calculation means 41 and deductive propagate means 42. Therefore, a diagnostic system more suitable for the nature of a specific problem can be built.

As shown in this embodiment, the verification calculation means 61, verification propagate means 62, and verification prune means 63, which are subdivided units of the verification means 6, can be customized to build a system which precisely satisfies the needs.

As shown in this embodiment, the control of coordination among the verification calculation means 61, verification propagate means 62, and verification prune means 63, which constitute the verification means 6, can be customized. Therefore, a model-based diagnostic system more suitable for the nature of a specific problem can be built.

[4. Embodiment 2]

Figure 30:
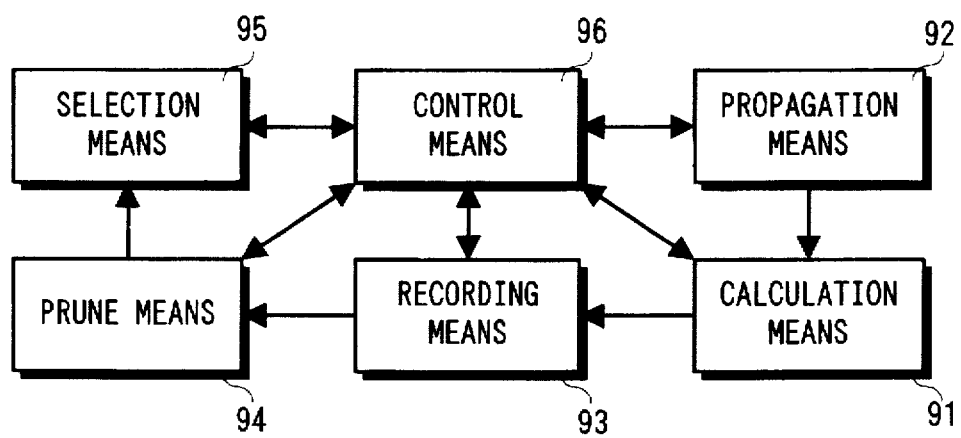
FIG. 30 is a functional block diagram showing the part which implements the deductive means and the verification means in the embodiment 2.
Figure 31:
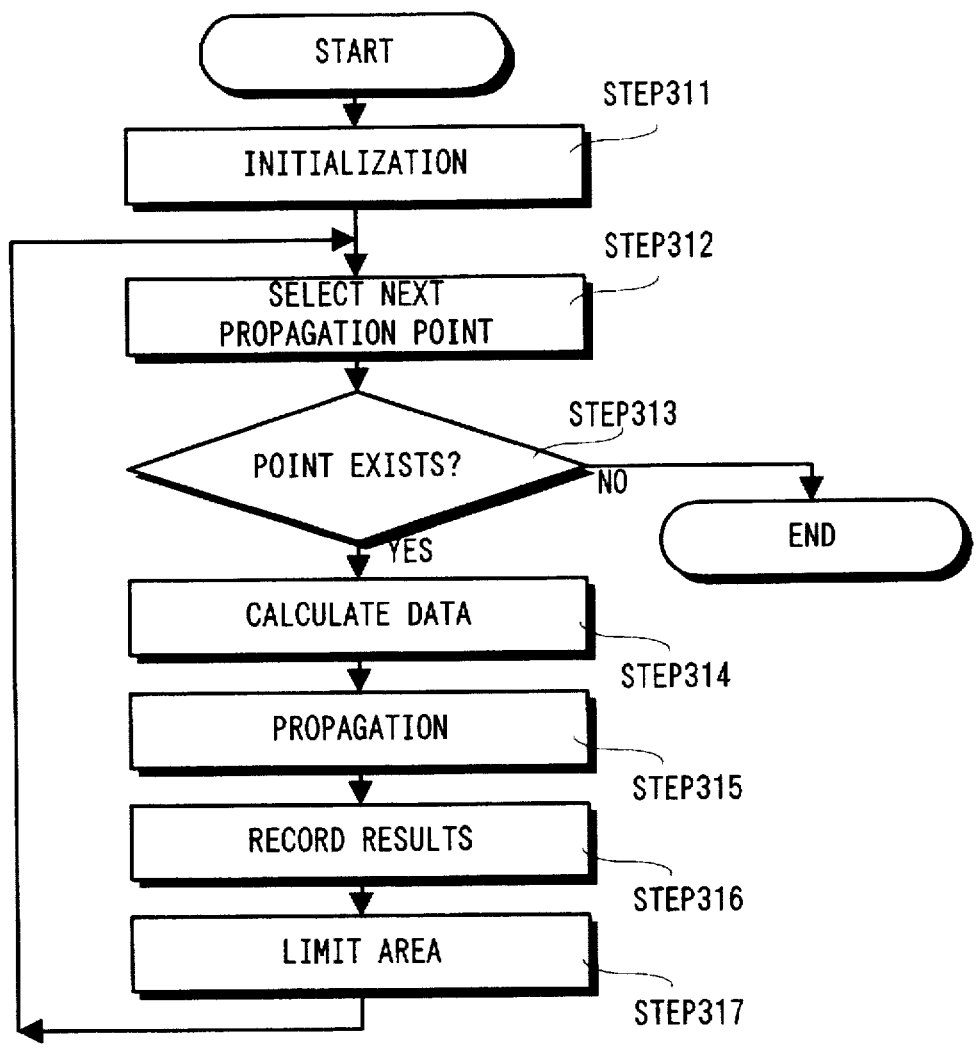
FIG. 31 is a flowchart showing the procedure of the deduction and the verification in the embodiment 2.

The deductive means and the verification means may be constructed unitedly (embodiment 2). FIG. 30 is a functional block diagram showing the part which implements the deductive means and the verification means. In embodiment 2, calculation means 91, propagation means 92, recording means 93, prune means 94 and selection means 95 perform the deduction of behavior in diagnosis target and the verification of hypothesis candidates by controlled by control means 96 with a prescribed procedure. FIG. 31 is a flowchart showing the procedure of the deduction and the verification in embodiment 2.

In this procedure, after the initializing (step 311), the process starts from a designated propagation point (step 312, 313), calculation means 91 calculates output data corresponds to input data in case of deduction and calculates input data corresponds to output data for each elements which constitute the diagnosis target. And propagation means 92 propagates output data of each elements to other elements which exist in effect-side course of the sequences in case of deduction and propagates input data of each elements to other elements which exists in cause-side course of the sequenced in case of verification based on the model. Recording means records the results of the calculations and the propagations. This recording prevents the duplicated processes.

Prune means 94 limits the area to be propagated based on said recorded results. For example, in the deduction for diagnosis for a part of the target, the area is limited in the part. Furthermore, for example, in the verification, the elements exists in the cause-side course of the elements in which deducted values match with observed values are removed from the area to be propagated.

Selection means selects elements to be propagated next one by one (step 312) until the propagation is executed for all necessary elements (step 313). The element as a unit of the propagation is not limited in parts but includes deductive point in the unit of data and parameters. The procedure data representing control means 96 is stored in some data storage.

Since the deductive means and the verification means can be constructed by same several means in the embodiment 2, the structure of this invention is simplified. Furthermore, diagnosis system is constructed efficiently in embodiment 2 because when one or more of these means is modified, the deductive means and the verification means is both modified. In embodiment 2, each means 91,92,93,94 and 95 can be customized so that it can be used in solving various types of problems by storing and modifying the procedure data representing the procedure of each means.

Embodiment 2 delivers the advantage especially when implemented on the computer program because the deductive means and the verification means is implemented on same single routine.

|5. Other Embodiments|

This invention is not restricted to the embodiment described above. Many variations, including those disrobed below, are possible as long as they realize the object of this invention.

For example, this invention can be used for diagnosis for not only electric circuit but also other target like computer software. This invention also can be use for purposes below. When output data from the target is different from output data expected by the designer, the designer can know how he (she) change the input data by calculating the coordination of input data to get the expected output data.

Furthermore, the simulation can be performed by calculating output data based on the changed input data by the deductive means. The designer can know if the change of the input data causes bad effect to other output data.

Also a unit procedure, which is used in the above embodiment to represent all the contents of each means may be divided into unit procedures each consisting of several meaningful steps.

In addition, context working memory consisting of a plurality sets of working memory for storing a plurality of data sets may be used as the working memory of this invention and, based on the relationship among the data sets, the access control means may be provided to control access to the context working memory. This enables working memory to be switched to provide larger memory space, thereby lowering the cost of a diagnostic system construction support system. At the same time, a change in each parameter value or data about a plurality of abnormality hypotheses may be stored in each working memory to uniquely identify each piece of data. In addition, separation of data access management from the reasoning control procedure makes system construction simpler and maintenance and modification easier.

Although a model-based diagnostic system construction support system in the above embodiment is implemented on a computer, all or part of its functions may be implemented on a electronic circuit.

|Effect of the Invention|

A model-based diagnostic system construction support system is provided to help construct a model-based diagnostic system that can be customized according to the nature of various target to diagnoses. Therefore, this system can reduce the cost and time needed to build a model-based diagnostic system.

What is claimed is:

1. A computer-implemented system for constructing a diagnostic system which diagnoses on a behavior of a diagnosis target comprising a plurality of elements by using a model, wherein said computer-implemented system comprises:

a deducing means comprising a function calculation means for calculating expected output data corresponding to input data for each of said elements based on said model, and a structural propagation means for propagating the output data of each of said elements to other elements associated with the element based on said model;

a hypothesizing means for comparing the output data of one element acquired by said function calculation means with an observed value of the element acquired from said diagnosis target for each of said elements, and presuming a candidate for an abnormality factor;

a hypothesis verification means comprising a function backward-calculation means for backward-calculating the input data from which output data is produced for each of said elements based on said model, and a structural propagation means for propagating the input data of each of said elements to other elements associated with the element based on said model, wherein said hypothesis verification means compares the input data of each of said elements acquired by said backward-calculation means with an observed value acquired from said diagnosis target and decides all elements each of which is free from abnormality;

a customizing means for setting up separately each of deductive procedure data representing how said deducing means operates, hypothesis procedure data representing how said hypothesizing means operates and hypothesis verification procedure data representing how said hypothesis verification means operates, into desired content.

2. A computer-implemented system for constructing a diagnostic system, wherein said diagnostic system uses a model representing a diagnosis target comprising a plurality of elements in view of a structural aspect and a functional aspect for each of said elements and diagnoses an abnormality of said diagnosis target based on said model, and wherein said computer-implemented system comprises:

a deducing means comprising a function calculation means for calculating expected output data corresponding to input data for each of said elements based on said model, and a structural propagation means for propagating the output data of each of said elements to other elements associated with the element based on said model;

a hypothesizing means for comparing the output data of one element acquired by said function calculation means with an observed value of the element acquired from said diagnosis target for each of elements located on the data-output side of and associated with a predetermined element, detecting an element having a different output data and observed value, and presuming an existence of a candidate for an abnormality factor within a group of the detected element and all elements located on the data-input side in relation to the detected element;

a hypothesis verification means comprising a function backward-calculation means for backward-calculating the input data from which output data is produced for each of said elements based on said model, and a structural propagation means for propagating the input data of each of said elements to other elements associated with the element based on said model, wherein said hypothesis verification means compares the input data of one element acquired by said backward-calculation means with an observed value of the element acquired from said diagnosis target for each of elements located on the data-input side of and associated with a predetermined element, for each of which its input data and observed value correspond with each other; and a customizing means for setting up separately each of deductive procedure data representing how said deducing means operates, hypothesis procedure data representing how said hypothesizing means operates and hypothesis verification procedure data representing how said hypothesis verification means operates, into desired content.

3. A computer-implemented system as claimed in claim 1 or 2, further comprising:

a reasoning control means for controlling coordinative relationships among said deducing means, said hypothesizing means, and said hypothesis verification means; and wherein said customizing means customizes reasoning control data representing how said reasoning control means operates.

4. A computer-implemented method for constructing a diagnostic system which diagnoses on a behavior of a diagnosis target comprising a plurality of elements by using a model, wherein said method comprises:

deducing process comprising a function calculation step for calculating expected output data corresponding to input data for each of said elements based on said model, and a structural propagation step for propagating the output data of each of said elements to other elements associated with the element based on said model;

hypothesizing process for comparing the output data of one element acquired by said function calculation step with an observed value of the element acquired from said diagnosis target for each of said elements, and presuming a candidate for an abnormality factor;

hypothesis verification process comprising a function backward-calculation step for backward-calculating the input data from which output data is produced for each of said elements based on said model, and a structural propagation step for propagating the input data of each of said elements to other elements associated with the element based on said model, wherein said hypothesis verification process compares the input data of each of said elements acquired by said backward-calculation step with an observed value acquired by said backward-calculation step with an observed value acquired from said diagnosis target and decides all elements each of which is free from abnormality; and a customizing process for setting up separately each of deductive procedure data representing how said deducing process operates, hypothesis procedure data representing how said hypothesizing process operates and hypothesis verification procedure data representing how said hypothesis verification process operates, into desired content.

5. A computer-implemented method for constructing a diagnostic system which diagnoses a diagnosis target by using a model representing said diagnosis target comprising a plurality of elements in view of a structural aspect and a functional aspect for each of said elements, wherein said method comprises:

deducing process comprising a function calculation step for calculating expected output data corresponding to input data for each of said elements based on said model, and a structural propagation step for propagating the output data of each of said elements to other elements associated with the element based on said model;

hypothesizing process for comparing the output data of one element acquired by said function calculation step with an observed value of the element acquired from said diagnosis target for each of elements located on the data-output side of and associated with a predetermined element, detecting an element having a different output data and observed value, and presuming an existence of a candidate for an abnormality factor within a group of the detected element and all elements located on the data-input side in relation to the detected element;

hypothesis verification process comprising a function backward-calculation step for backward calculating the input data from which output data is produced for each of said elements based on said model, and a structural propagation step for propagating the input data of each of said elements to other elements associated with the element based on said model, wherein said hypothesis verification process starts from said predetermined element, compares the input data of one element acquired by said backward-calculation means with an observed value of the element acquired from said diagnosis target for each of elements located on the data-input side of and associated with said predetermined element, and decides an absence of an abnormality for all elements, for each of which its input data and observed value correspond with each other; and customizing process for setting up separately each of deductive procedure data representing how said deducing process operates, hypothesis procedure data representing how said hypothesizing process operates and hypothesis verification procedure data representing how said hypothesis verification process operates, into desired content.

6. A computer-implemented system for constructing a system by using a model representing a system comprising a plurality of elements in view of a structural aspect and a functional aspect for each element of said plurality of elements, wherein said computer-implemented system comprises:

a plurality of basic tasks, corresponding to a deducing means, a hypothesizing means and a hypothesis verification means, for executing each process requested for constructing a system by using said model;

procedure data representing how each of said basic tasks operates, wherein said procedure data, corresponding to the features of said model, includes first procedure data representing functional operation, second procedure data representing structural operation, and third procedure data for controlling of how each of said basic tasks operates;

each of said basic tasks including a first executing means for executing a process related to function based on said first procedure data, a second executing means for executing a process related to structural propagation based on said second procedure data, and a third executing means for controlling of how said first and second executing means execute based on the third procedure data; and a customizing means for setting up at least one of said first, second and third procedure data into desired content.

7. A computer-implemented system as claimed in claim 6, wherein:

said customizing means sets up fourth procedure data representing how orderly said plurality of basic tasks operate;

said system further comprising controlling means for controlling of how orderly said plurality of basic tasks operate based on the fourth data set up by said customizing means.

8. A computer-implemented method for constructing a system by using a model representing a system comprising a plurality of elements in view of a structural aspect and a functional aspect for each of said elements, the method comprises the steps of:

providing a plurality of basic tasks, corresponding to a deducing means, a hypothesizing means and a hypothesis verification means, for executing each process requested for constructing a system by using said model;

providing procedure data representing how each of said basic tasks operates, wherein said procedure data, corresponding to features of said model, includes first procedure data representing a functional operation, second procedure data representing a structural operation, and third procedure data for controlling of how each of said basic tasks operates; and executing processes by each of said basic tasks, wherein said processes includes a first executing step for executing a process related to function based on the first procedure data set up by a customizing process, a second executing step for executing a process related to structural propagation based on said second procedure data set up by the customizing process, and a third executing step for controlling how said first and second executing steps execute based on the third procedure data set up by the customizing process.

9. A computer-implemented method as claimed in claim 8, wherein how orderly said plurality of basic tasks operate is controlled based on fourth data set up by the customizing process.

* * * * *